(12) United States Patent
Qi

(10) Patent No.: US 12,276,870 B2
(45) Date of Patent: Apr. 15, 2025

(54) EYEGLASS LENS

(71) Applicant: HOYA LENS THAILAND LTD., Pathumthani (TH)

(72) Inventor: Hua Qi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 452 days.

(21) Appl. No.: 17/909,612

(22) PCT Filed: Jan. 18, 2021

(86) PCT No.: PCT/JP2021/001522
§ 371 (c)(1),
(2) Date: Sep. 6, 2022

(87) PCT Pub. No.: WO2021/186878
PCT Pub. Date: Sep. 23, 2021

(65) Prior Publication Data
US 2023/0113972 A1   Apr. 13, 2023

(30) Foreign Application Priority Data
Mar. 17, 2020   (JP) ................... 2020-046050

(51) Int. Cl.
G02C 7/06   (2006.01)
(52) U.S. Cl.
CPC ..................... G02C 7/061 (2013.01)
(58) Field of Classification Search
CPC .......... G02C 7/022; G02C 7/06; G02C 7/061; G02C 2202/24
USPC .................................................. 351/159.42
See application file for complete search history.

(56) References Cited

U.S. PATENT DOCUMENTS

| 10,571,717 B2* | 2/2020 | Neitz ............... B29D 11/00009 |
| 2012/0062836 A1 | 3/2012 | Tse et al. |
| 2015/0124212 A1* | 5/2015 | Loertscher ............. G02C 7/047 351/159.02 |
| 2016/0377884 A1 | 12/2016 | Lau et al. |

(Continued)

FOREIGN PATENT DOCUMENTS

| CN | 104678572 A | 6/2015 |
| JP | 2017010031 A | 1/2017 |

(Continued)

OTHER PUBLICATIONS

JP2022-508091, "Notice of Reasons for Refusal" with Machine Translation, Jan. 31, 2022, 8 pages.

(Continued)

Primary Examiner — William R Alexander
(74) Attorney, Agent, or Firm — Oliff PLC

(57) ABSTRACT

The present invention provides an eyeglass lens and its related techniques, the eyeglass lens including: a base region that causes a light flux that has entered from an object-side face to exit from an eyeball-side face, and to enter an eye and converge at a position A on a retina; and a plurality of defocus regions that are in contact with the base region, wherein the defocus regions each include a first portion and a second portion, a refractive power of the first portion is within ±0.12 D of the refractive power of the base region, and a light flux that passes through the second portion of the defocus region is incident on the position A as diverging light.

6 Claims, 31 Drawing Sheets

(56) References Cited

U.S. PATENT DOCUMENTS

| | | | |
|---|---|---|---|
| 2017/0131567 A1 | 5/2017 | To et al. | |
| 2017/0146824 A1* | 5/2017 | Martinez | G02C 7/06 |
| 2017/0184875 A1* | 6/2017 | Newman | B29D 11/00326 |
| 2019/0033619 A1* | 1/2019 | Neitz | G02C 7/16 |
| 2019/0227342 A1 | 7/2019 | Brennan et al. | |
| 2019/0369416 A1* | 12/2019 | Sankaridurg | G02C 7/066 |
| 2020/0012123 A1 | 1/2020 | Newman | |
| 2020/0073147 A1 | 3/2020 | Bakaraju et al. | |
| 2021/0278699 A1 | 9/2021 | Qi et al. | |
| 2021/0278704 A1 | 9/2021 | Qi et al. | |
| 2022/0350169 A1* | 11/2022 | Sankaridurg | G02C 7/022 |

FOREIGN PATENT DOCUMENTS

| | | |
|---|---|---|
| JP | 2019128599 A | 8/2019 |
| JP | 2020016886 A | 1/2020 |
| JP | 2020500328 A | 1/2020 |
| WO | 2015147758 A1 | 10/2015 |
| WO | 2019166657 A1 | 9/2019 |
| WO | 2020004551 A1 | 1/2020 |
| WO | 2020004552 A1 | 1/2020 |
| WO | 2020261213 A1 | 12/2020 |

OTHER PUBLICATIONS

PCT/JP2021/001522, "International Preliminary Report on Patentability", Sep. 29, 2022, 5 pages.

EP21771050, "Extended European Search Report", Mar. 12, 2024, 7 pages.

KR10-2022-7021698, "Request for the Submission of an Opinion", with machine translation, Feb. 28, 2024, 6 pages.

PCT/JP2021/001522, "English Translation of International Search Report", Mar. 30, 2021, 2 pages.

* cited by examiner

FIG. 4A
Example 1
FIG. 4B
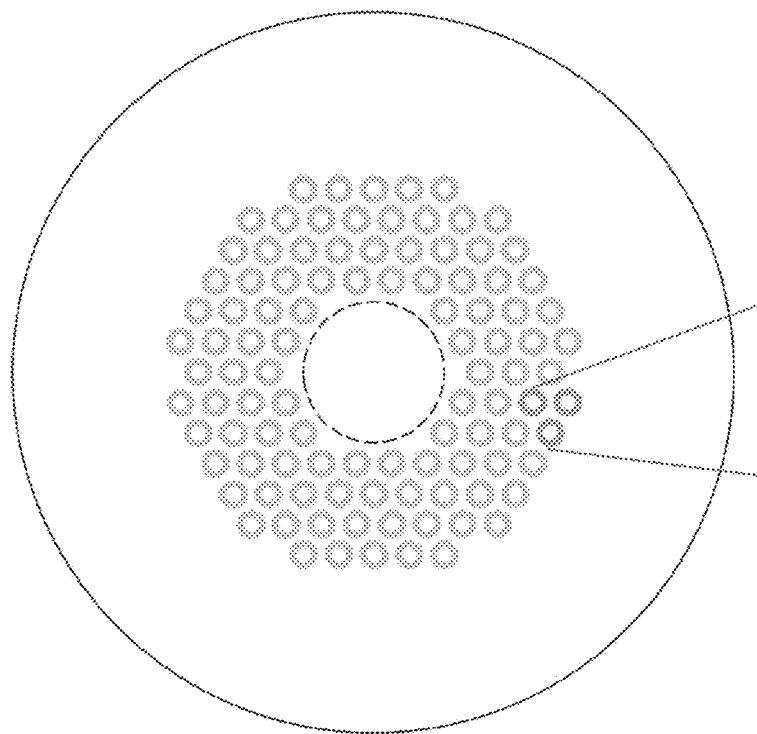
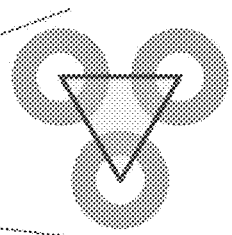
FIG. 4C
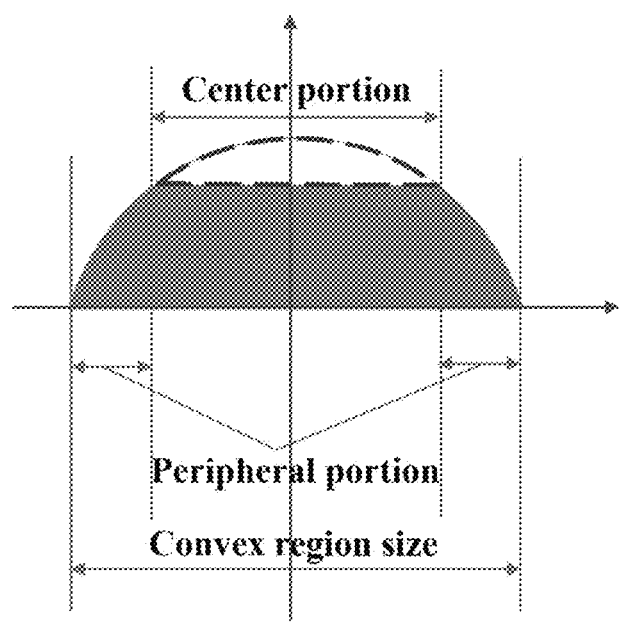

Example 1

4mm

T=1.4mm  $\Phi_1$=0.6mm  $\Phi_2$=1.2mm

Profile power curve = derivative of deviation angle curve

Example 2

Profile power curve = derivative of deviation angle curve

FIG. 13A
Example 3
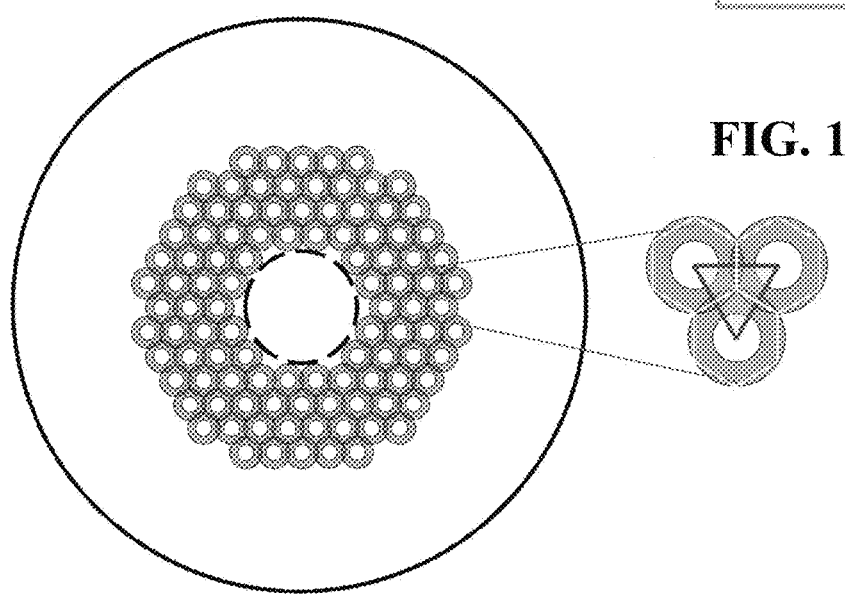
FIG. 13B
FIG. 14A
Example 3
FIG. 14B
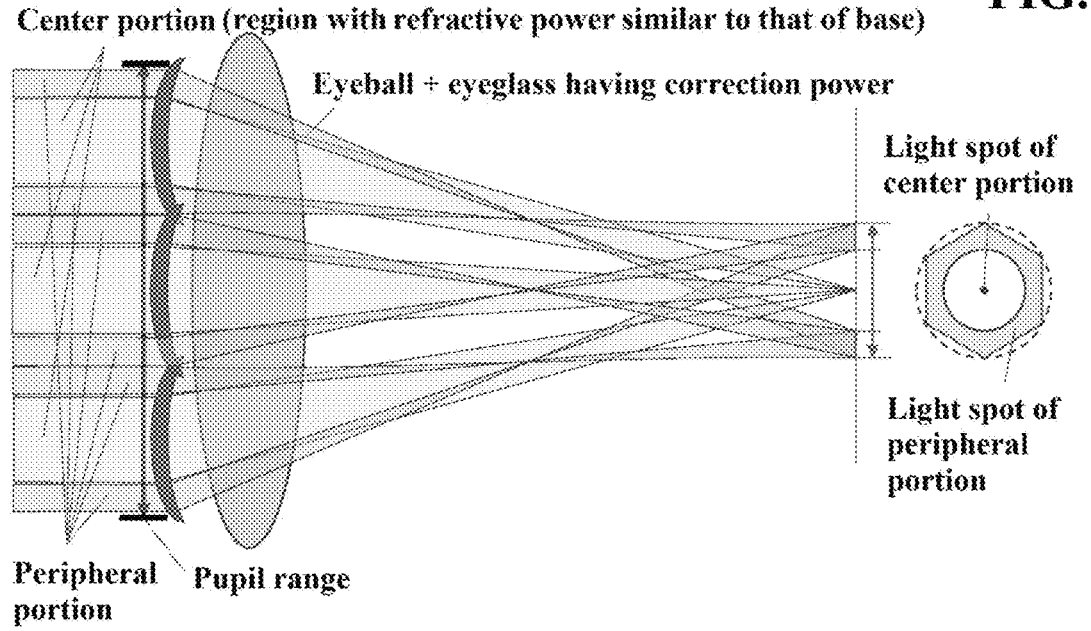
Center portion (region with refractive power similar to that of base)
Eyeball + eyeglass having correction power
Light spot of center portion
Light spot of peripheral portion
Peripheral portion
Pupil range Example 3

FIG. 19A
Example 4
FIG. 19B
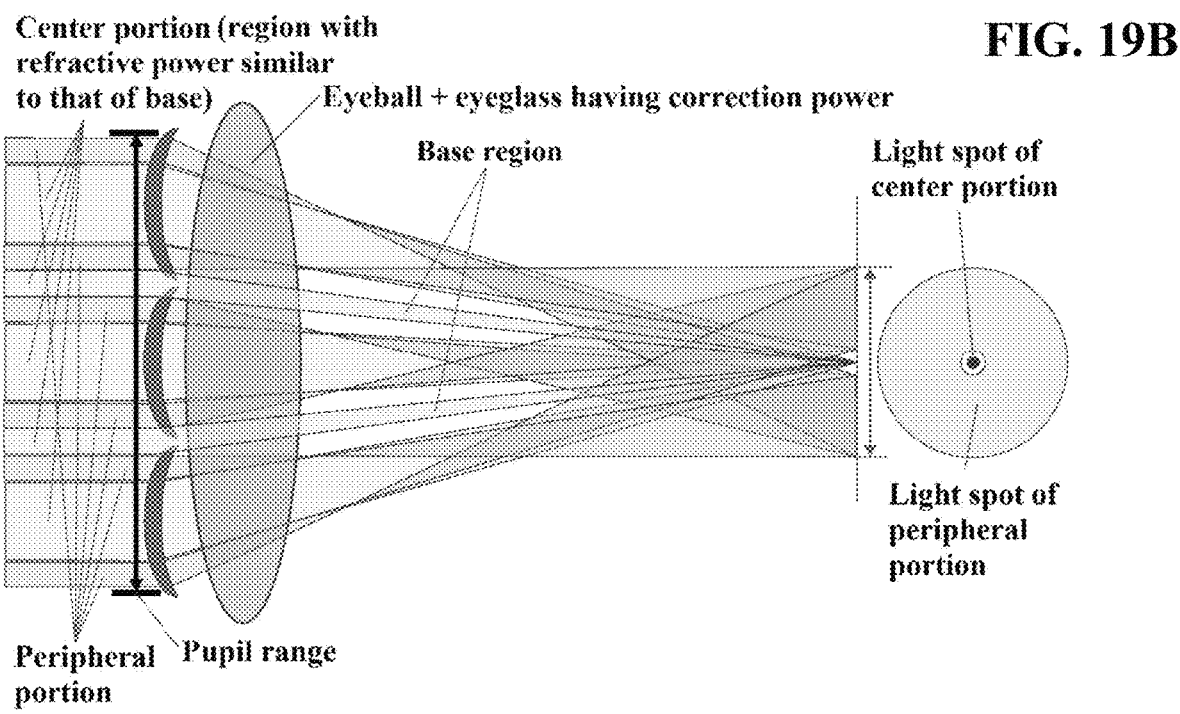
FIG. 19C
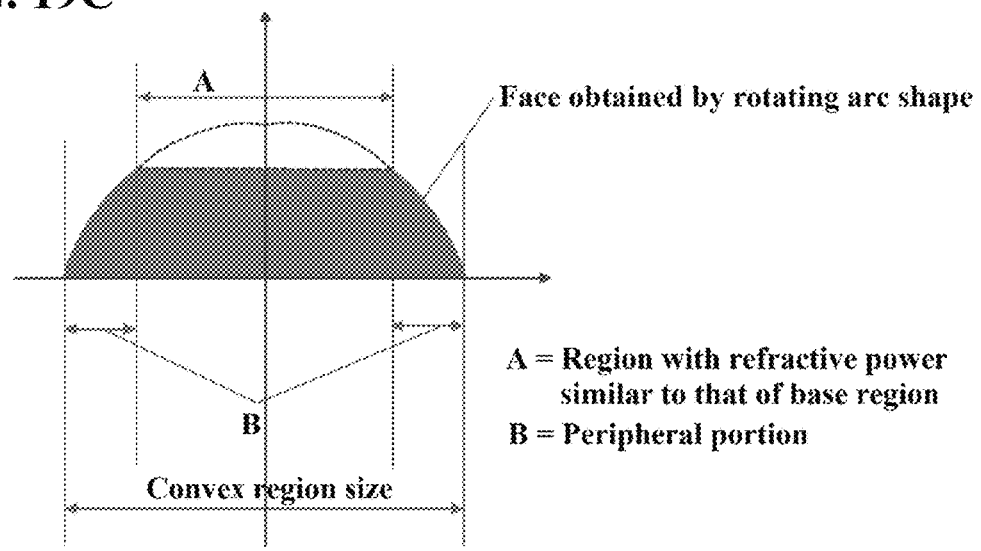
A = Region with refractive power similar to that of base region
B = Peripheral portion Example 4

Profile power curve = derivative of deviation angle curve

Example 5

Center portion (region with refractive power similar to that of base)

Eyeball + eyeglass having correction power

Peripheral portion   Pupil range

Example 6

Light spot of center portion

Light spot of peripheral portion

Example 6

Example 7

4mm

T=1.309mm
Φ₁=0.972mm    Φ₂=1.512mm

Example 7

A = Deviation angle curve
= curve of convex region profile prism angle of deviation Proportional to difference between slopes of front and rear profile curves Example 7

Profile power curve = derivative of deviation angle curve

FIG. 37A  Example 8
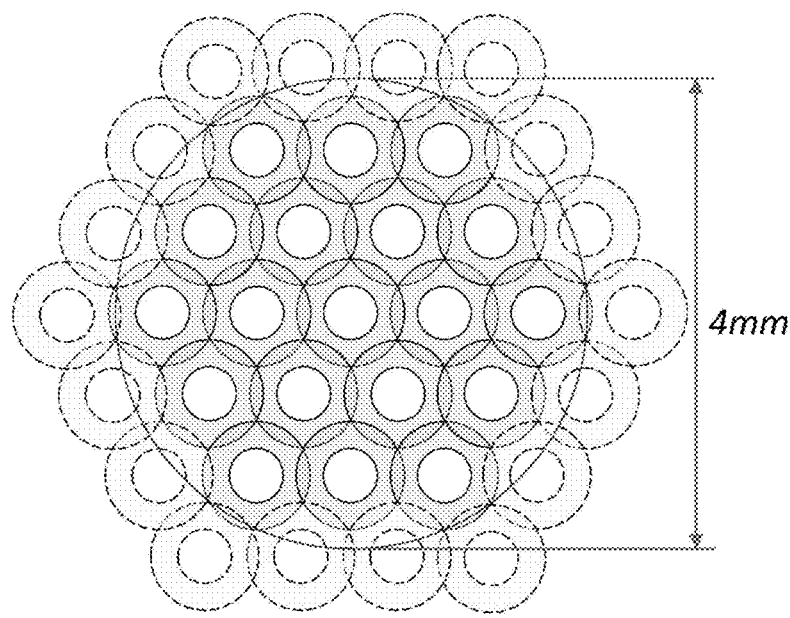
FIG. 37B
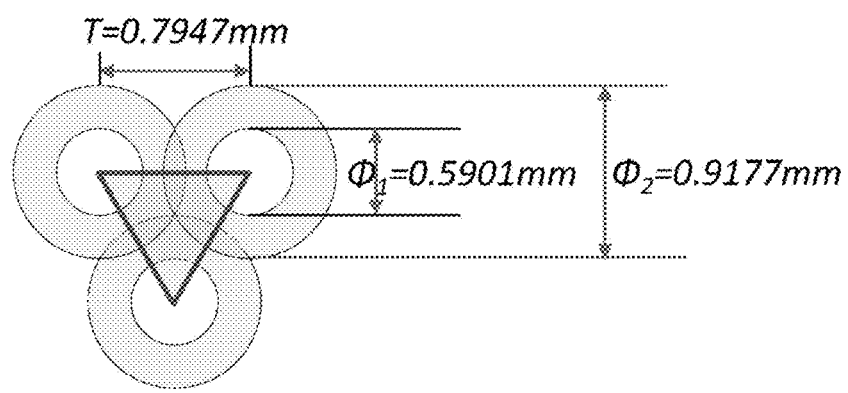

EYEGLASS LENS

CROSS-REFERENCE TO RELATED APPLICATIONS

This application is the National Stage of International Application No. PCT/JP2021/001522, filed Jan. 18, 2021, which claims priority to Japanese Patent Application No. 2020-046050, filed Mar. 17, 2020, and the contents of which is incorporated by reference.

TECHNICAL FIELD

The present disclosure relates to an eyeglass lens.

BACKGROUND ART

There are eyeglass lenses for suppressing the progression of a refractive error such as myopia, in which a plurality of convex regions are formed on a convex face serving as an object-side face, the convex regions each having a curved face different from the convex face and projecting from the convex face (see Patent Document 1, for example). According to eyeglass lenses with this configuration, although a light flux that enters a lens from an object-side face and exits from an eyeball-side face is focused on a retina of a wearer in principle, a light flux that passes through the convex regions is focused at a position that is closer to an object than the retina is, and thus myopia progression is suppressed.

CITATION LIST

Patent Document

Patent Document 1: U.S. Patent Application Publication No. 2017/0131567

SUMMARY OF DISCLOSURE

Technical Problem

The disclosure described in Patent Document 1 suppresses the myopia progression, by causing a light flux that passes through a plurality of convex regions, which are second refractive regions, to be focused in front of a retina. The inventor of the present disclosure re-examined the mechanism by which the disclosure described in Patent Document 1 exerts the myopia progression suppressing effect.

Understanding the mechanism of myopia progression is a shortcut to understanding the mechanism of the myopia progression suppressing effect.

An accommodative lag is conceivable as a theory explaining the mechanism of myopia progression. In near vision, an eyeball is expected to have a predetermined accommodative power in a normal state, but there are cases in which the accommodative power of the eyeball is actually insufficient. This insufficiency of the accommodative power is an accommodative lag.

When there is an accommodative lag, a light flux that passes through an eyeball (a pupil, to be more precise) converges to form an image behind the retina. This state facilitates elongation of the axial length of the eye (eyeball growth), causing myopia to progress. This hypothesis is called accommodative lag.

It is believed that there is no sensor in an eye that directly detects whether the image is formed behind or in front of a retina. On the other hand, according to the accommodative lag theory, it is natural that a human has some sort of mechanism that detects a change in an image on a retina.

One possibility for this mechanism is to detect a change in the image caused by accommodative microfluctuations.

For example, when the image is formed behind the retina, a light flux from an object enters the retina as a converging light flux. When the accommodative power of the crystalline lens in the eyeball is reduced (the ciliary body is relaxed and the crystalline lens becomes thinner), the image further moves rearward, and the size of a light spot on the retina increases. On the other hand, when the accommodative power is increased (the ciliary body is contracted and the crystalline lens becomes thicker), the size of a light spot on the retina decreases. It seems that there is a mechanism in which a change in the size of a light spot caused by accommodative microfluctuations is detected by the optic nerve or through subsequent cortical information processing, and a signal for facilitating eyeball growth is output, and thus myopia progresses.

"Light spot" of this specification refers to an image formed on the retina by light from an object point transmitted through part of an eyeglass lens and the eye's optical system. The light spot appears as a single point when in focus, and appears as a light distribution with a certain size when not in focus (defocus).

Another possibility for the mechanism that detects a change in an image on a retina is to detect the light intensity density of a light spot.

If the intensity of light emitted is constant, the smaller the area of the light spot, the greater the light intensity density. When the accommodative power of the crystalline lens in the eyeball is reduced, the image further moves rearward, and the light intensity density of the light spot on the retina decreases. On the other hand, when the accommodative power is increased, the light intensity density of the light spot on the retina increases. It seems that there is a mechanism in which a change in the light intensity density of a light spot caused by accommodative microfluctuations is detected by the optic nerve or through subsequent cortical information processing, and a signal for facilitating eyeball growth is output, and thus myopia progresses.

Regardless of the mechanism, the mechanism of the disclosure described in Patent Document 1 suppresses the myopia progression by using perception of a change in the size of a light spot formed on a retina by light from an object point (or a change in the light intensity density) caused by accommodative microfluctuations of an eyeball. That is to say, the larger the amount of change in the light spot size or the amount of change in the light intensity density per predetermined eye's accommodative amount, the greater the myopia progression suppressing effect (viewpoint 1).

As illustrated in the description of accommodative microfluctuations above, when the image is formed behind the retina, a light flux from an object enters the retina as a converging light flux. A wavefront of light formed by the converging light flux is referred to as a convergent wavefront. That is to say, according to the above-described accommodative lag, myopia progresses when a wavefront that enters the retina is a convergent wavefront.

In that case, it is possible to suppresses the myopia progression, by providing a situation in which a divergent wavefront enters the retina, which is opposite to the above-mentioned situation (viewpoint 2). Actually, in Patent Document 1, an eyeglass lens is provided with a second refractive region, so that a light flux that passes through the second refractive region is caused to converge in front of a retina, at a point different from the focal point at which a light flux that passes through the first refractive region converges. A light flux that passes through the second refractive region converging in front of a retina means that a divergent wavefront enters the retina.

Based on the viewpoints 1 and 2 above, increasing the divergence degree of the diverging light flux in order to increase a change in the light spot size (or the light intensity density) per predetermined eye's accommodative amount while causing a diverging light flux to enter a retina improves the myopia progression suppressing effect.

To increase the divergence degree of the diverging light flux, it is sufficient to increase the size (e.g., the diameter) or the refractive power (the power) of regions corresponding to the convex regions in Patent Document 1.

On the other hand, if the size of the convex regions is increased, the area of a region corresponding to the first refractive region (a base region for realizing a prescription power) in Patent Document 1 accordingly decreases. This impairs the comfort of using the eyeglass lens.

It is an aspect of an embodiment of the present disclosure to provide a technique for improving the myopia progression suppressing effect while maintaining the comfort of using an eyeglass lens.

Solution to Problem

The inventor of the present disclosure conducted an in-depth study in order to solve the above-described problems. As a result, the inventor adopted an expression "defocus region" as a concept that encompasses the convex regions, and arrived at a configuration in which a first portion and a second portion are set as portions constituting the defocus region. The configuration was arrived at in which the first portion has a refractive power corresponding to that of a base region, thereby contributing to maintaining the comfort, and the second portion causes a light flux to be incident on a position A as diverging light.

The following aspects were arrived at based on the above-described findings.

A first aspect of the present disclosure is directed to an eyeglass lens including:

a base region that causes a light flux that has entered from an object-side face to exit from an eyeball-side face, and to enter an eye and converge at a position A on a retina; and a plurality of defocus regions that are in contact with the base region, wherein the defocus regions each include a first portion and a second portion, a refractive power of the first portion is within ±0.12 D of a refractive power of the base region, and a light flux that passes through the second portion of the defocus region is incident on the position A as diverging light.

A second aspect of the present disclosure is directed to the eyeglass lens according to the first aspect, in which the second portion is in the shape of a spherical face.

A third aspect of the present disclosure is directed to the eyeglass lens according to the first aspect, in which the second portion is in the shape of an aspherical curved face.

A fourth aspect of the present disclosure is directed to the eyeglass lens according to any one of the first to third aspects, in which the defocus regions are convex regions, and the eyeglass lens is a myopia progression suppressing lens.

A fifth aspect of the present disclosure is directed to the eyeglass lens according to any one of the first to fourth aspects, in which the first portions of the defocus regions do not exert an additional prismatic effect on the base region.

A sixth aspect of the present disclosure is directed to the eyeglass lens according to any one of the first to fifth aspects, in which, in a graph in which a visual angle [arcmin] is plotted on an X axis, and a light intensity density is plotted on a Y axis, the light intensity density is zero outside a light intensity density peak at a visual angle of zero, and the light intensity density is higher than zero outside the visual angle at which the light intensity density is zero.

Other aspects of the present disclosure that can be combined with the above-described aspects are as follows.

The defocus regions are convex regions.

The first portion is a center portion, and the second portion is a peripheral portion.

The second portion is in the shape of a curved face that is a rotationally symmetric aspherical face (with cut-out arcs).

Examples of the arrangement of the convex regions in plan view include an arrangement in which they are independently and discretely arranged such that the centers of the convex regions respectively match vertices of a regular triangle (the centers of the convex regions are respectively arranged at vertices of a honeycomb structure).

The diameter of each of the convex regions is preferably approximately 0.6 to 2.0 mm. The projecting height (projecting amount) of each of the convex regions is approximately 0.1 to 10 µm, and preferably approximately 0.5 to 2.0 µm.

Advantageous Effects of Disclosure

According to the embodiment of the present disclosure, it is possible to provide a technique for improving the myopia progression suppressing effect while maintaining the comfort of using an eyeglass lens.

BRIEF DESCRIPTION OF DRAWINGS

FIG. 4A is a schematic plan view showing a state of the eyeglass lens of Example 1 in which convex regions are discretely arranged in a honeycomb structure and are separated from each other, FIG. 4B is a schematic enlarged plan view showing three convex regions out of the convex regions, and FIG. 4C is a schematic side view showing one convex region.

FIG. 13A is a schematic plan view showing a state of the eyeglass lens of Example 3 in which convex regions are discretely arranged in a honeycomb structure and overlap each other, and FIG. 13B is a schematic enlarged plan view showing three convex regions out of the convex regions. Adjacent circular convex regions partially overlap each other, but their common chord is taken as a boundary. If the size of the convex regions is increased and the base region between the adjacent convex regions is completely lost, the boundary between a convex region and six convex regions arranged therearound is in the shape of a regular hexagon, and each convex region is in the shape of a hexagon.

FIG. 14A is a schematic side view showing a state in which, when an eyeglass lens having a prescription power and an eyeball are collectively regarded as one optical system, an incident light flux from an infinitely distant object passes through a plurality of convex regions of the eyeglass lens of Example 3 and enters the retina, and FIG. 14B is a schematic view of an image obtained in FIG. 14A.

FIG. 19A is a schematic side view showing a state in which, when an eyeglass lens having a prescription power and an eyeball are collectively regarded as one optical system, an incident light flux from an infinitely distant object passes through a plurality of convex regions of the eyeglass lens of Example 4 and enters the retina, FIG. 19B is a schematic view of an image obtained in FIG. 19A, and FIG. 19C is a schematic side view showing one convex region.

FIG. 37A is a schematic plan view showing the number and the state of convex regions arranged in a 4-mm circle (assumed pupil size) of the eyeglass lens of Example 8, and FIG. 37B is a plan view showing the size and the interval of three adjacent convex regions out of the convex regions.

DESCRIPTION OF EMBODIMENTS

Figure 1:
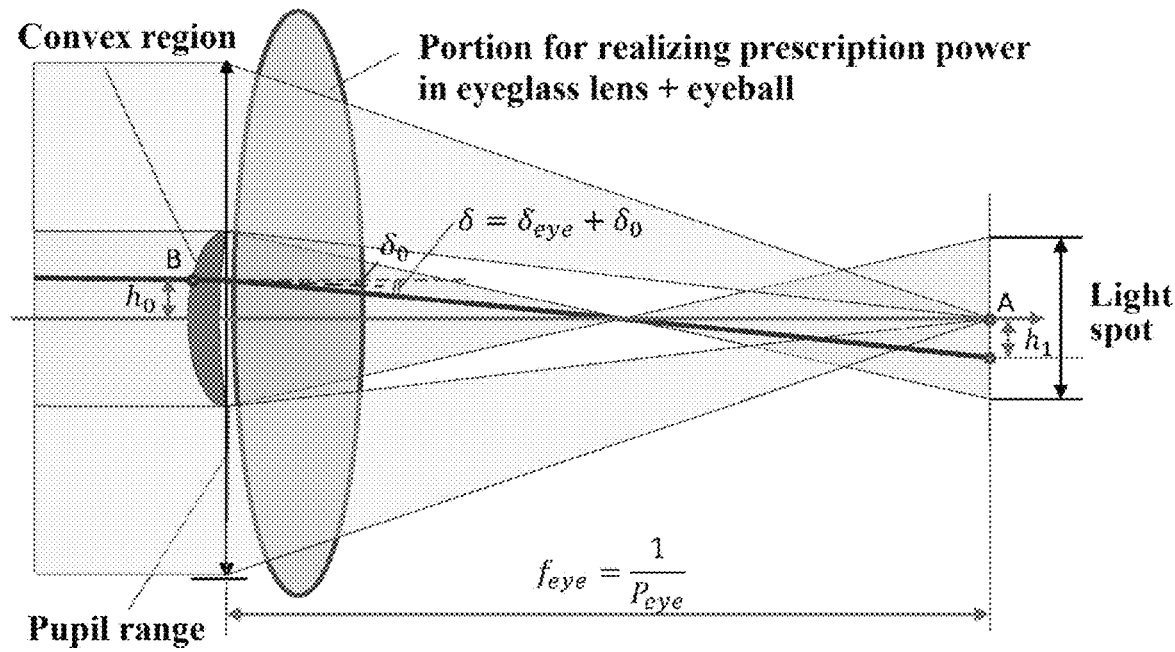
FIG. 1 is a schematic side view showing a state in which, when an eyeglass lens having a prescription power and an eyeball are collectively regarded as one optical system, an incident light flux from an infinitely distant object passes through one convex region of the eyeglass lens and enters the retina.

Hereinafter, an embodiment of the present disclosure will be described. The description based on the drawings in the following is illustrative, and the disclosure is not limited to the illustrated aspects. The contents not described in this specification are those described in Patent Document 1, and the contents not described in Patent Document 1 (especially the contents relating to the production method) are those described in WO2020/004551 ("WO document"). If there is any discrepancy between the contents of the description in Patent Document 1 and the description in the WO document, priority is given to the description in the WO document.

The eyeglass lens referred to in this specification has at least an object-side face and an eyeball-side face. The "object-side face" is a surface that is located on the object side when a wearer wears a pair of glasses including the eyeglass lens, and the "eyeball-side face" is a surface that is located on the opposite side, that is, the eyeball side when the wearer wears the pair of glasses including the eyeglass lens. A substrate of the eyeglass lens with a refractive index of 1.0 or more is provided between the object-side face and the eyeball-side face. Furthermore, an eyeglass lens is also conceivable in which at least one intermediate face is provided between the object-side face and the eyeball-side face, and transparent substrates with different refractive indexes are provided on the front and back side of the intermediate face.

Eyeglass Lens

An aspect of the present disclosure is directed to the following eyeglass lens.

"An eyeglass lens including:

a base region that causes a light flux that has entered from an object-side face to exit from an eyeball-side face, and to enter an eye and converge at a position A on a retina; and a plurality of defocus regions that are in contact with the base region, wherein the defocus regions each include a first portion and a second portion, a refractive power of the first portion is within ±0.12 D of a refractive power of the base region, and a light flux that passes through the second portion of the defocus region is incident on the position A as diverging light."

The base region is a portion with a shape that can realize a prescription power of a wearer, and corresponds to the first refractive region in Patent Document 1.

Each of the defocus regions is a region at least part of which does not allow light to be focused at a focus position of the base region. The convex regions according to an aspect of the present disclosure are encompassed by defocus regions.

The defocusing power exerted by each defocus region refers to a difference between the refractive power of the defocus region and the refractive power of the portion outside the defocus region. In other words, "defocusing power" is a difference obtained by subtracting the refractive power of the base portion from the average of the lowest and highest refractive powers of a given part of a defocus region.

The convex regions are portions corresponding to the micro-convex portions of Patent Document 1. As with the eyeglass lens described in Patent Document 1, the eyeglass lens according to an aspect of the present disclosure is a myopia progression suppressing lens. As with the micro-convex portions of Patent Document 1, it is sufficient that the plurality of convex regions according to an aspect of the present disclosure are formed on at least any one of the object-side face, the eyeball-side face, and the intermediate face of the eyeglass lens. In this specification, a case in which the plurality of convex regions are formed only on the object-side face of the eyeglass lens will be mainly described as an example.

Each convex region according to an aspect of the present disclosure is configured such that a light flux that passes through at least part of the convex region is incident on a position A on the retina as diverging light. The "diverging light" is the diverging light flux (the light flux having a divergent wavefront) described in "Technical Problem". A light flux may be incident on the position A on the retina as diverging light regardless of the portion of the convex region through which the light flux passes, or a light flux may be incident on the position A on the retina as diverging light when the light flux passes through a certain portion of the convex region.

An aspect of the present disclosure is that, based on the above-described configuration, the first and second portions are then set as portions constituting the convex region, the first portion has a refractive power corresponding to that of the base region, thereby contributing to maintaining the comfort, and the second portion causes a light flux to be incident on the position A as diverging light.

The "refractive power" in this specification refers to the average refractive power, which is the average of the refractive power in a direction a where the refractive power is lowest and the refractive power in a direction b (the direction that is perpendicular to the direction a) where the refractive power is highest. The refractive power at the center portion is, for example, the vertex refractive power at the center in plan view when the convex region is a small ball-shaped segment, as with an aspect of the present disclosure.

In an aspect of the present disclosure, the first portion is a center portion. The center portion refers to the center (or the center of gravity, a description thereof will be omitted hereinafter) of the convex region in plan view, or a portion in the vicinity thereof. Hereinafter, the description "in plan view" will be omitted regarding the convex region, and a shape means a shape in plan view unless otherwise specified.

The center portion has a refractive power corresponding to that of the base region. The "refractive power corresponding to that of the base region" means a value within ±0.12 D (preferably ±0.10 D, and more preferably ±0.05 D) of the refractive power of the base region.

The center portion may have a single refractive power, or the shape of the center portion may vary finely and the refractive power may vary locally as well. In the case of the latter, the refractive power may be determined by Zernike decomposition of the surface shape of the first region using a quadratic term coefficient.

In an aspect of the present disclosure, the second portion is a peripheral portion. The peripheral portion refers to a portion of the convex region in the vicinity of the boundary between the convex region and the base region (the bottom of the convex region), and is located outside of the center portion. In an aspect of the present disclosure, a case in which the convex region is constituted by the center portion and the peripheral portion will be described as an example. The outward direction viewed from the center portion is also referred to as the direction from the center portion to the peripheral portion, and refers to the direction from the center to the bottom of the convex region in plan view, that is, the radial direction.

It is possible to improve the myopia progression suppressing effect while maintaining the comfort of using the eyeglass lens, by using the above-described configuration.

Preferred Examples and Modified Examples of Eyeglass Lens

Hereinafter, preferred examples and modified examples of the eyeglass lens according to an aspect of the present disclosure will be described.

Although a circular region is mentioned as the shape of the convex region in plan view, the present disclosure is not limited to this, and an elliptical region is also acceptable. Other shapes (e.g., a rectangular shape) are also acceptable, but circular or elliptical regions are preferred because of the possibility of unintended aberrations or stray light due to the shape.

In a similar manner, there is no limitation on the shape of the center portion in plan view, but circular or elliptical regions are preferred for the same reason. Furthermore, there is no limitation on the shape of the peripheral portion in plan view but circular ring-like or elliptical ring-like regions are preferred for the same reason.

The center portion according to an aspect of the present disclosure has a refractive power corresponding to that of the base region. In the case of a myopia progression suppressing lens, the eyeglass lens itself is often a unifocal lens, and thus a case in which the base region and the center portions of the defocus regions are in the shape of spherical faces will be described as an example of an aspect of the present disclosure. If the center portion is in the shape of a spherical face, the center portion may be a concave portion of the convex region, and the shape may be equal to an extension of the surface shape of the base region, which is in the shape of a spherical face.

On the other hand, the three-dimensional shape of the peripheral portion can be in the shape of a spherical face or an aspherical curved face.

If the peripheral portion is in the shape of a spherical face (Examples 1 to 3 below), as long as a diverging light flux is incident on the position A on the retina, there is no limitation on the curvature (refractive power) of the spherical face, but, for example, it is preferably +1.0 to +30 D of the refractive power of the base region.

If the peripheral portion is in the shape of an aspherical face, as long as a diverging light flux is incident on the position A on the retina, there is no limitation on the details of the shape, and, for example, it may be a rotationally symmetric aspherical face (e.g., with cut-out arcs) formed by rotating various cross-sections defined by curved lines about the normal line of the base spherical face (Example 4 to 8 below), an aspherical face whose curvature changes in the direction from the center portion to the peripheral portion, or a toric face.

If the peripheral portion is in the shape of an aspherical face, the average refractive power of the peripheral portion (the average of the lowest and highest refractive powers) may be +1.0 to +50 D of the refractive power of the base region.

In any case, it is preferable not to exert an additional prismatic effect on the base region. In addition to ensuring that the comfort is maintained due to the center portion, it is preferable not to exert an additional prismatic effect on the peripheral portion, as this will prevent the image from being seen as a double image, and the comfort will be further maintained.

The boundary between the center portion and the peripheral portion may be determined according to settings of the ratio between the area of the center portion and the area of the peripheral portion. This ratio may be appropriately determined based on the balance between the degree of myopia progression suppressing effect and the comfort while taking into consideration the area of the base region other than the convex regions. For example, in a certain range of eyeglass lens region (e.g., within the pupil range), the ratio may be determined such that (area of base region+ area of center portions of all convex regions in the range): (area of peripheral portions of all convex regions in the range) is from 20:80 to 80:20, and preferably from 40:60 to 60:40.

However, the present disclosure is not limited to the above-described shapes. The reasons for this are explained below.

Those that create a situation in which a divergent wavefront enters the retina are not limited to the convex regions with spherical faces mentioned as the three-dimensional shape of the peripheral portions, and various surface shapes of the peripheral portions are acceptable. The surface shape that optimizes the myopia suppressing effect may be designed. However, for this purpose, an appropriate method for evaluating the myopia progression suppressing effect is necessary.

Possible methods for evaluating the myopia progression suppressing effect are to evaluate the rate of a change in the area or radius of a light spot on the retina with respect to a change in the accommodative amount and/or the rate of a change in the (average or highest) light intensity density of a light spot on the retina with respect to a change in the accommodative amount.

FIG. 1 is a schematic side view showing a state in which, when an eyeglass lens having a prescription power and an eyeball are collectively regarded as one optical system, an incident light flux from an infinitely distant object passes through one convex region of the eyeglass lens and enters the retina.

When the refractive power [unit: D] of an optical system including both an eyeglass lens having a prescription power and an eyeball is taken as $P_{eye}$, the focal length is $f_{eye}=1/P_{eye}$.

Then, if each convex region is a circular region that is rotationally symmetric about an axis in plan view, and the prism angle of deviation [unit: radian] (also referred to simply as an "angle of deviation" hereinafter) at a point B that is away from the center of the circular region by ho is $\delta_0$, a height hi on the image plane of a light flux that passes through the point B on the convex region and enters the retina can be calculated using a paraxial calculation (paraxial approximation) that does not take aberrations into account, as Numerical Expression 1 below.

$$h_1 = h_0 - (\delta_{eye} + \delta_0) f_{eye} = h_0 - (h_0 P_{eye} + \delta_0) \frac{1}{P_{eye}} = -\frac{\delta_0}{P_{eye}}$$

Numerical Expression 1

The diameter $R_{PSF}$ of a light spot on the retina and the area $S_{PSF}$ of the light spot can be obtained from Numerical Expression 1 above as follows.

$$R_{PSF} = \frac{\delta_{0max}}{P_{eye}}$$

Numerical Expression 2

$$S_{PSF} = \pi \left(\frac{\delta_{0max}}{P_{eye}}\right)^2$$

Numerical Expression 3

PSF stands for a point spread function, and is a parameter obtained by employing the ray tracing method. PSF is obtained by tracing a large number of rays emitted from a light source point and calculating the light intensity density of a light spot on an arbitrary plane. The PSFs on the plurality of arbitrary planes are then compared with each other to identify the position (plane) where the rays are focused the most among the plurality of arbitrary planes. The diameter of the rays can be set based on the pupil diameter, and is, for example, 4 mmφ.

The refractive power of a human eye when looking at an object is not constant and constantly accommodates itself through microfluctuations to find the optimal focus position. The size of a light spot formed through the convex region also changes due to the accommodative microfluctuations. For example, if an eyeball accommodates itself so that the refractive power of the optical system including both the eyeglass lens and the eyeball reaches a value obtained by adding a refractive power A corresponding to the accommodative amount to $P_{eye}$, Numerical Expressions 2 and 3 are expressed as Numerical Expressions 4 and 5 below.

$$R_{PSF}(A) = \frac{\delta_{0max}}{P_{eye} + A}$$

Numerical Expression 4

$$S_{PSF}(A) = \pi \left(\frac{\delta_{0max}}{P_{eye} + A}\right)^2$$

Numerical Expression 5

The rate of a change in the radius of a light spot can be obtained as follows by finding a derivative of Numerical Expression 4 and substituting 0 for A.

$$\frac{dR_{PSF}}{dA}(0) = -\frac{\delta_{0max}}{P_{eye}^2}$$

Numerical Expression 6

The rate of a change in the area of a light spot can be obtained as follows by finding a derivative of Numerical Expression 5 and substituting 0 for A.

$$\frac{dS_{PSF}}{dA}(0) = -2\pi \frac{\delta_{0max}^2}{P_{eye}^3}$$

Numerical Expression 7

The above-mentioned expression regarding the area is for the case in which a light spot formed by a convex region is circular. Depending on the shape of the convex region, light spots may be distributed in a ring or other shapes, in which case the expression may be set according to the shape formed by the light spots. The expression regarding the light intensity density may also be set individually according to the shape design of the convex region.

Depending on the individual shape design, the maximum angle of deviation $\delta_{0max}$ varies, and the size and the light intensity distribution of a light spot on the retina also vary. There are also various ideas about light intensity density. In the case of Patent Document 1, the micro-convex portions are in the shape of spherical faces, and thus, when aberration is not considered, a light spot on the retina is circular and the light intensity is evenly distributed, so the light intensity density can be easily calculated. In the case of a convex region with other surface shapes, the shape of a light spot on the retina is different from that of Patent Document 1, and the light intensity may not be evenly distributed. On the other hand, the rate of a change in the area of a light spot with respect to the accommodation can be directly obtained. Regarding the light intensity density, for example, the average light intensity density of the entire light spot or the highest light intensity density within a light spot may be obtained, and the rate of a change with respect to the accommodation may be taken as an evaluation index for the myopia progression suppressing effect.

According to Numerical Expression 6 or 7, the rate of a decrease in the light spot size due to accommodation is proportional to the maximum angle of deviation $\delta_{0max}$ or to the square of $\delta_{0max}$. It can be assured that the larger the maximum angle of deviation of the micro-convex portions, the greater the myopia progression suppressing effect. In the case of Patent Document 1, the convex regions are in the shape of spherical faces, and the maximum angle of deviation is proportional to the radius of the convex regions. It is possible to increase the maximum angle of deviation by increasing the size of the convex regions, but it reduces the area of the base portion when the intervals of the convex regions are determined, which may impair the comfort. To solve this contradiction, an embodiment of the present disclosure divides each convex region into a center portion and a peripheral portion, the center portion has almost the same refractive power as the base region, and the peripheral portion causes diverging light to enter the retina.

With the above-described method for evaluating the myopia progression suppressing effect, the surface can be designed to optimize the myopia suppressing effect. This means that the myopia suppression effect can be appropriately evaluated after employing convex regions with various surface shapes. As a result, there is no longer any limitation on the surface shape of the convex regions.

Furthermore, when creating a situation in which a divergent wavefront enters the retina, there is no limitation on the number and the arrangement of convex regions arranged within the range of the pupil diameter. The reasons for this are explained below using the structure of an eyeglass lens of later-described Example 1.

Figure 2:
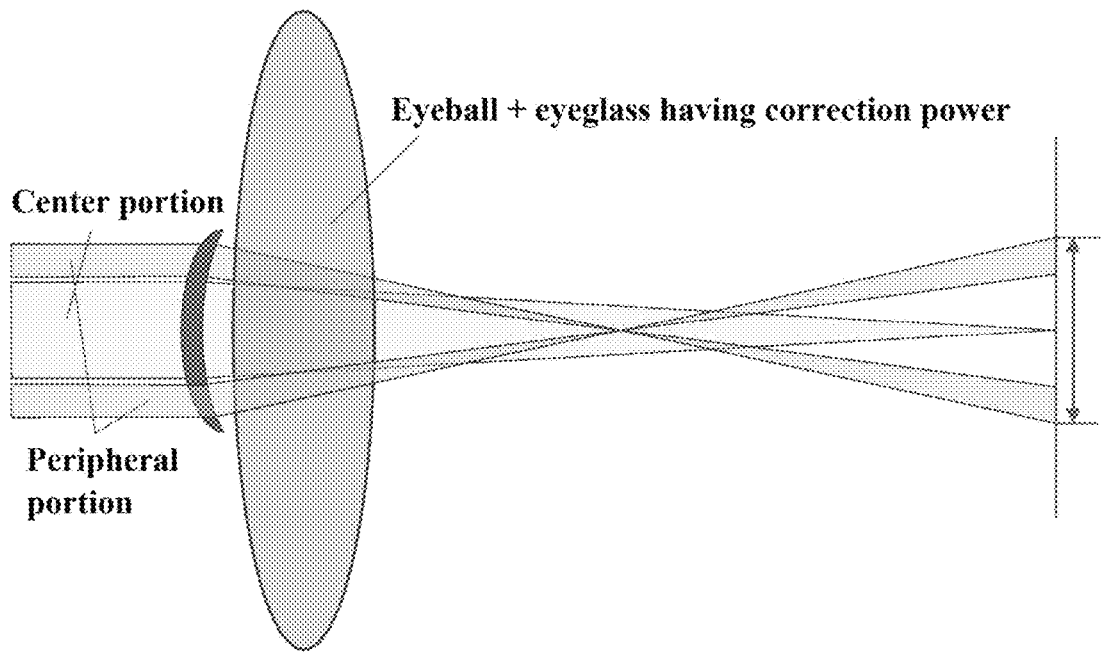
FIG. 2 is a schematic side view showing a state in which, when an eyeglass lens having a prescription power and an eyeball are collectively regarded as one optical system, an incident light flux from an infinitely distant object passes through one convex region of the eyeglass lens of Example 1 and enters the retina.

FIG. 2 is a schematic side view showing a state in which, when an eyeglass lens having a prescription power and an eyeball are collectively regarded as one optical system, an incident light flux from an infinitely distant object passes through one convex region of the eyeglass lens of Example 1 and enters the retina.

Figure 3:
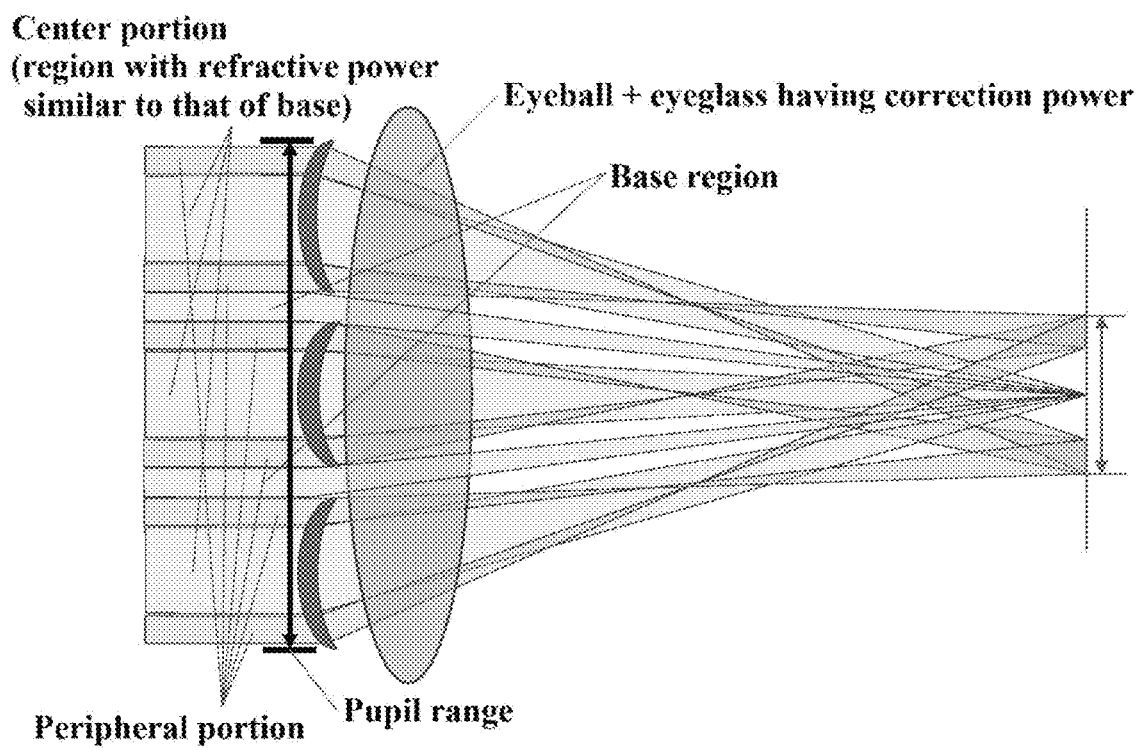
FIG. 3 is a schematic side view showing a state in which, when an eyeglass lens having a prescription power and an eyeball are collectively regarded as one optical system, an incident light flux from an infinitely distant object passes through a plurality of convex regions of the eyeglass lens of Example 1 and enters the retina.

FIG. 3 is a schematic side view showing a state in which, when an eyeglass lens having a prescription power and an eyeball are collectively regarded as one optical system, an incident light flux from an infinitely distant object passes through a plurality of convex regions of the eyeglass lens of Example 1 and enters the retina.

As shown in FIG. 3, when a plurality of convex regions are placed within the range of the pupil diameter, each convex region forms a light spot with a finite size on the retina. When individual convex regions are arranged along the surface of the eyeglass lens, the main ray that passes through the arrangement position matches the ray at the corresponding position of the eyeglass lens in the case in which there are no convex regions and converges to form an image on the retina without generating a prism overall.

Accordingly, in this case, the center positions of light spots formed through all convex regions match each other, and no image is seen as a double image. Furthermore, if all convex regions has the same surface shape, the light spots completely overlap each other on the retina. If the refractive power A for accommodation is added, the centers of the light spots overlap each other while being displaced from each other along the main rays. The displacement amount is proportional to the interval between the convex regions.

It is possible to evaluate the myopia suppressing effect by calculating the size of a light spot formed by adding light spots formed though all convex regions that are displaced from each other, the rate of a change in the area caused by accommodation, and/or the rate of a change in the average or largest value or the like of the light intensity density caused by accommodation.

Specific Example of Eyeglass Lens

There is no particular limitation on the arrangement of the plurality of convex regions, and it can be determined, for example, from the viewpoint of the visibility of the convex regions from the outside, design enhancement by the convex regions, refractive power adjustment by the convex regions, and the like.

Substantially circular convex regions may be arranged in an island-like form (i.e., separated from each other without being adjacent to each other) at equal intervals in the circumferential and radial directions around the lens center (Example 1, etc.). Examples of the arrangement of the convex regions in plan view include an arrangement in which they are independently and discretely arranged such that the centers of the convex regions respectively match vertices of a regular triangle (the centers of the convex regions are respectively arranged at vertices of a honeycomb structure).

However, an aspect of the present disclosure is not limited to the contents described in Patent Document 1. That is to say, the arrangement is not limited to that in which the convex regions are separated from each other without being adjacent to each other, and they may be in contact with each other (Example 2, etc.), may overlap each other in plan view (Example 3, etc.), or may be arranged non-independently like a string of beads.

Each convex region has, for example, the following configuration. The diameter of the convex region is preferably approximately 0.6 to 2.0 mm. The projecting height (projecting amount) of the convex region is approximately 0.1 to 10 μm, and preferably approximately 0.4 to 1.0 μm or 0.5 to 2.0 μm. The portion with the highest refractive power in the peripheral portion of the convex region is preferably set to have a refractive power larger than that of a region in which no convex region is formed by approximately 2.50 to 30 diopters.

The lens substrate is made of, for example, a thermosetting resin material such as thiourethane, allyl, acrylic, or epithio resin. As the resin material for forming the lens substrate, other resin materials that realize a desired refractive index may be selected. The lens substrate may also be made of inorganic glass instead of resin material.

A hard coat film is made of, for example, a thermoplastic or UV curable resin. The hard coat film can be formed by dipping the lens substrate in the hard coat solution or by using spin coating or other methods. This coating with the hard coat film improves the durability of the eyeglass lens.

An antireflection film is formed, for example, through vacuum deposition of an antireflective agent such as $ZrO_2$, $MgF_2$, or $Al_2O_3$. This coating with the antireflection film improves the visibility of an image through the eyeglass lens.

As described above, a plurality of convex regions are formed on the object-side face of the lens substrate. Accordingly, when their faces are coated with the hard coat film and the antireflection film, the hard coat film and the antireflection film also form a plurality of convex regions, following the convex regions of the lens substrate.

To produce the eyeglass lens, first, the lens substrate is molded using a known molding method such as injection mold polymerization. For example, a lens substrate having convex regions on at least one surface is obtained by performing molding through pouring polymerization using a molding die having a molding face with a plurality of concave portions.

Once the lens substrate is obtained, a hard coat film is then formed on the surface of the lens substrate. The hard coat film can be formed by dipping the lens substrate in the hard coat solution or by using spin coating or other methods.

Once the hard coat film is obtained, an antireflection film is then formed on the surface of the hard coat film. The hard coat film can be formed through vacuum deposition of an antireflective agent.

With the production method following this procedure, it is possible to obtain an eyeglass lens in which a plurality of convex regions projecting toward the object side are formed on the object-side face.

The thickness of each film formed through the above-described process may be, for example, 0.1 to 100 μm (preferably 0.5 to 5.0 μm, and more preferably 1.0 to 3.0 μm). However, the thickness of the films is determined according to the function required for the films, and is not limited to the ranges given as an example.

One or more films may be further formed on the films. Examples of such films include various films such as an antireflection film, a water-repellent or hydrophilic antifouling film, and an antifog film. These films can be formed using a known technique.

EXAMPLES

The following examples are provided to illustrate the present disclosure in detail. It will be appreciated that the disclosure is not limited to the following examples.

The examples described in this section can be classified by type as shown in Table 1 below.

TABLE 1

| | Shape of second portion (peripheral portion) | Number of defocus regions in pupil diameter | Distance between defocus regions in plan view | Interpolation mode of deviation angle curve |
|---|---|---|---|---|
| Ex. 1 | Spherical face | 7 | Separated | Straight line |
| Ex. 2 | Spherical face | 19 | Contact | Straight line |
| Ex. 3 | Spherical face | 7 | Overlap | Straight line |
| Ex. 4 | Rotationally symmetric aspherical face | 7 | Separated | Straight line |
| Ex. 5 | Rotationally symmetric aspherical face | 7 | Separated | Curved line |
| Ex. 6 | Rotationally symmetric aspherical face | 7 | Overlap | Straight line |
| Ex. 7 | Rotationally symmetric aspherical face | 7 | Overlap | Curved line |
| Ex. 8 | Rotationally symmetric aspherical face | 19 | Overlap | Curved line |

Example 1

An eyeglass lens as follows was produced. The eyeglass lens was constituted only by a lens substrate, and the lens substrate was not coated with other substances. The prescription power was set to S (spherical power) 0.00 D and C (cylindrical power) 0.00 D. In Example 1, the convex regions were separated from each other in plan view.
Diameter of lens substrate in plan view: 100 mm
Type of lens substrate: PC (polycarbonate)
Refractive index of lens substrate: 1.589
Refractive power of base region of lens substrate: 0.00 D
Face on which convex regions are formed: object-side face
Range in which convex regions are formed: within a circle with a radius of 20 mm from the lens center (except for a regular hexagonal region in which a circle with a radius of 3.8 mm from the lens center is inscribed)
Shape of convex region in plan view: regular circle (diameter 1.2 mm)
Diameter of center portion of convex region: 0.60 mm
Refractive power of center portion of convex region: same as refractive power of base region
Shape of peripheral portion of convex region: spherical face
Angle of deviation at bottom of convex region (in vicinity of boundary between convex region and base region): 7.22 arcmin (corresponding to a refractive power of 3.5 D when the convex region is in the shape of a spherical face).
A refractive power P corresponding to this angle of deviation can be obtained using $P=d\delta/dr$ [the unit of $\delta$ is radian (Note that the unit may be omitted hereinafter. The unit is shown as arcmin in the drawings.)].
Arrangement of convex regions in plan view: the convex regions are independently and discretely arranged such that the centers of the convex regions respectively match vertices of a regular triangle (the centers of the convex regions are respectively arranged at vertices of a honeycomb structure)
Pitch between convex regions (distance between centers of convex regions): 1.4 mm
Number of convex regions in pupil diameter: 7
This PSF used paraxial approximation, and did not use the eyeball model.
FIG. 4A is a schematic plan view showing a state of the eyeglass lens of Example 1 in which convex regions are discretely arranged in a honeycomb structure and are separated from each other, FIG. 4B is a schematic enlarged plan view showing three convex regions out of the convex regions, and FIG. 4C is a schematic side view showing one convex region.

Figure 5A:
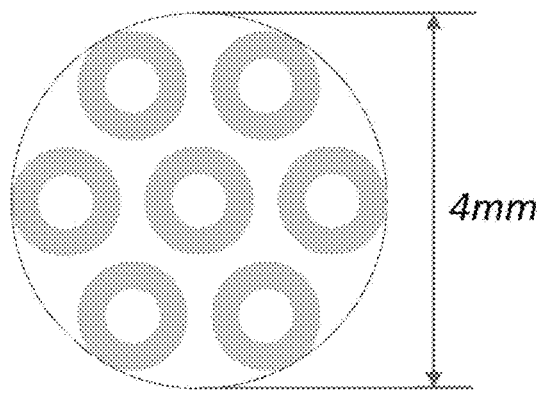
FIG. 5A is a schematic plan view showing the number and the state of convex regions arranged in a 4-mm circle (assumed pupil size) of the eyeglass lens of Example 1.
Figure 5B:
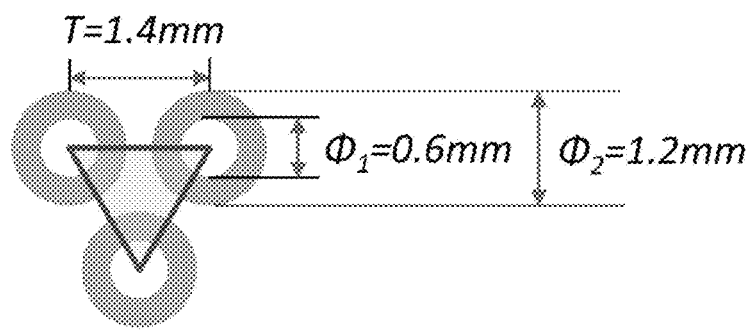
FIG. 5B is a plan view showing the size and the interval of three adjacent convex regions out of the convex regions.

FIG. 5A is a schematic plan view showing the number and the state of convex regions arranged in a 4-mm circle (assumed pupil size) of the eyeglass lens of Example 1, and FIG. 5B is a plan view showing the size and the interval of three adjacent convex regions out of the convex regions. According to this design, in the triangle in FIG. 5B, (area of base region+center portions of convex regions):(area of peripheral portions of convex regions)=50:50. That is to say, this design is to maintain (area of prescription power region):(area of myopia progression suppressing region) at 50:50 on the lens.

Figure 6:
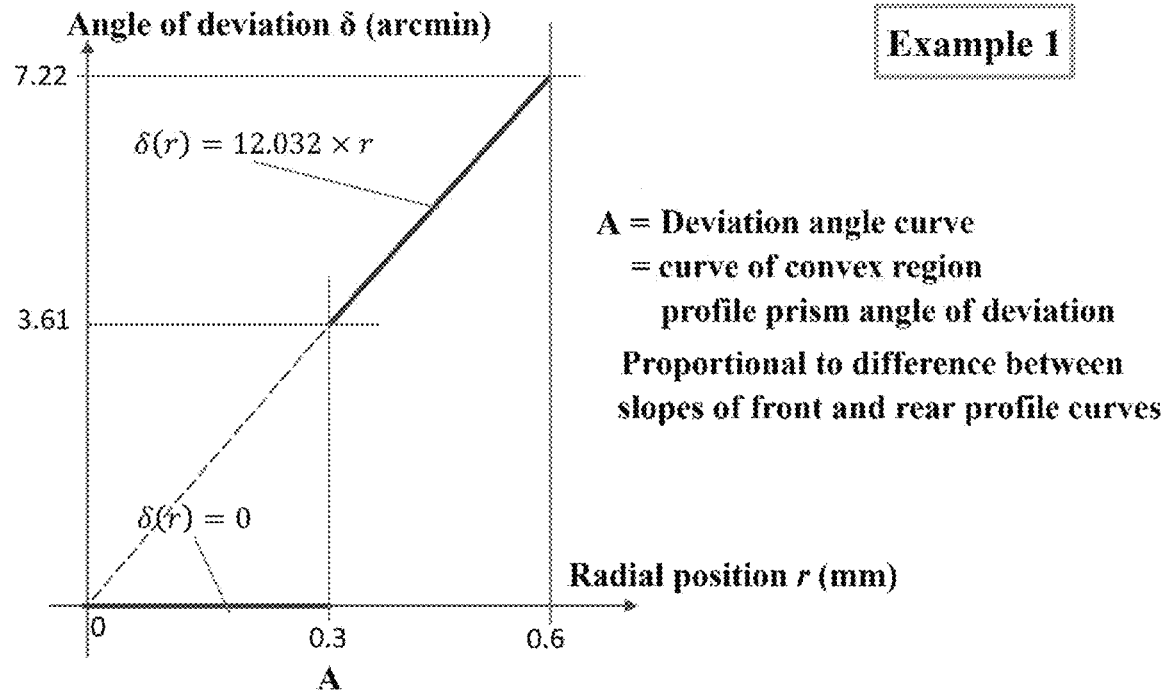
FIG. 6 is a graph of Example 1 in which the radial position [mm] from the center of a convex region is plotted on the X axis, and the angle of deviation δ [arcmin] is plotted on the Y axis.

FIG. 6 is a graph of Example 1 in which the radial position [mm] from the center of a convex region is plotted on the X axis, and the angle of deviation $\delta$ [arcmin] is plotted on the Y axis. The deviation angle function is expressed by Numerical Expression 8 below.

$$\delta(r) = \begin{cases} 0 & 0 < r < 0.3 \\ 12.032 \times r & 0.3 \le r \le 0.6 \end{cases} \quad \text{Numerical Expression 8}$$

Figure 7:
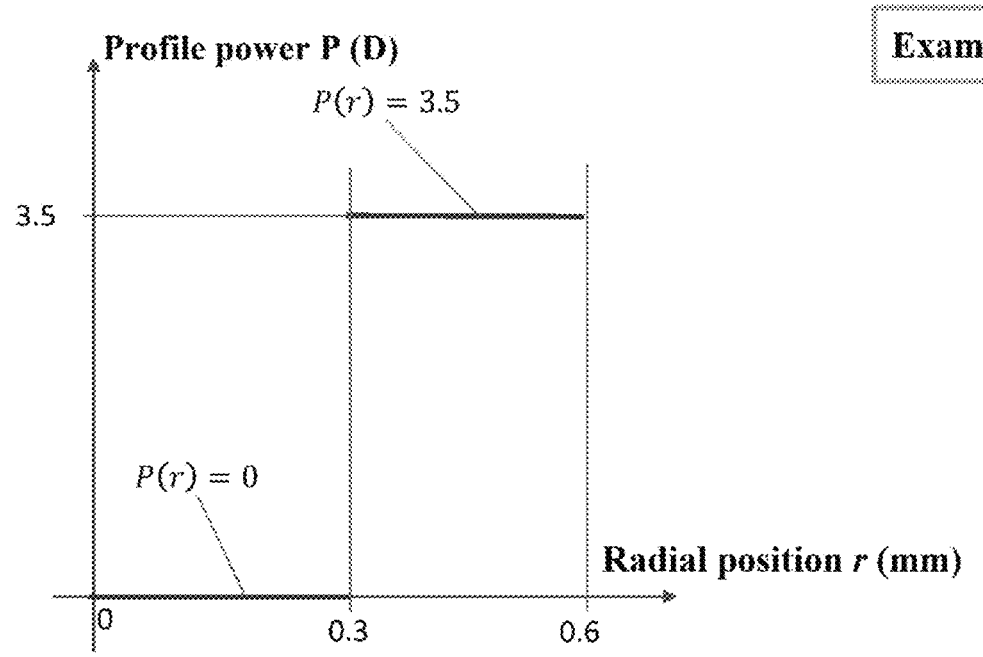
FIG. 7 is a graph of Example 1 in which the radial position [mm] from the center of a convex region is plotted on the X axis, and the profile power P [D] is plotted on the Y axis.

FIG. 7 is a graph of Example 1 in which the radial position [mm] from the center of a convex region is plotted on the X axis, and the profile power P [D] is plotted on the Y axis. The profile power function is expressed by Numerical Expression 9 below.

$$P(r) = \begin{cases} 0 & 0 < r < 0.3 \\ 3.5 & 0.3 \le r \le 0.6 \end{cases} \quad \text{Numerical Expression 9}$$

Figure 8:
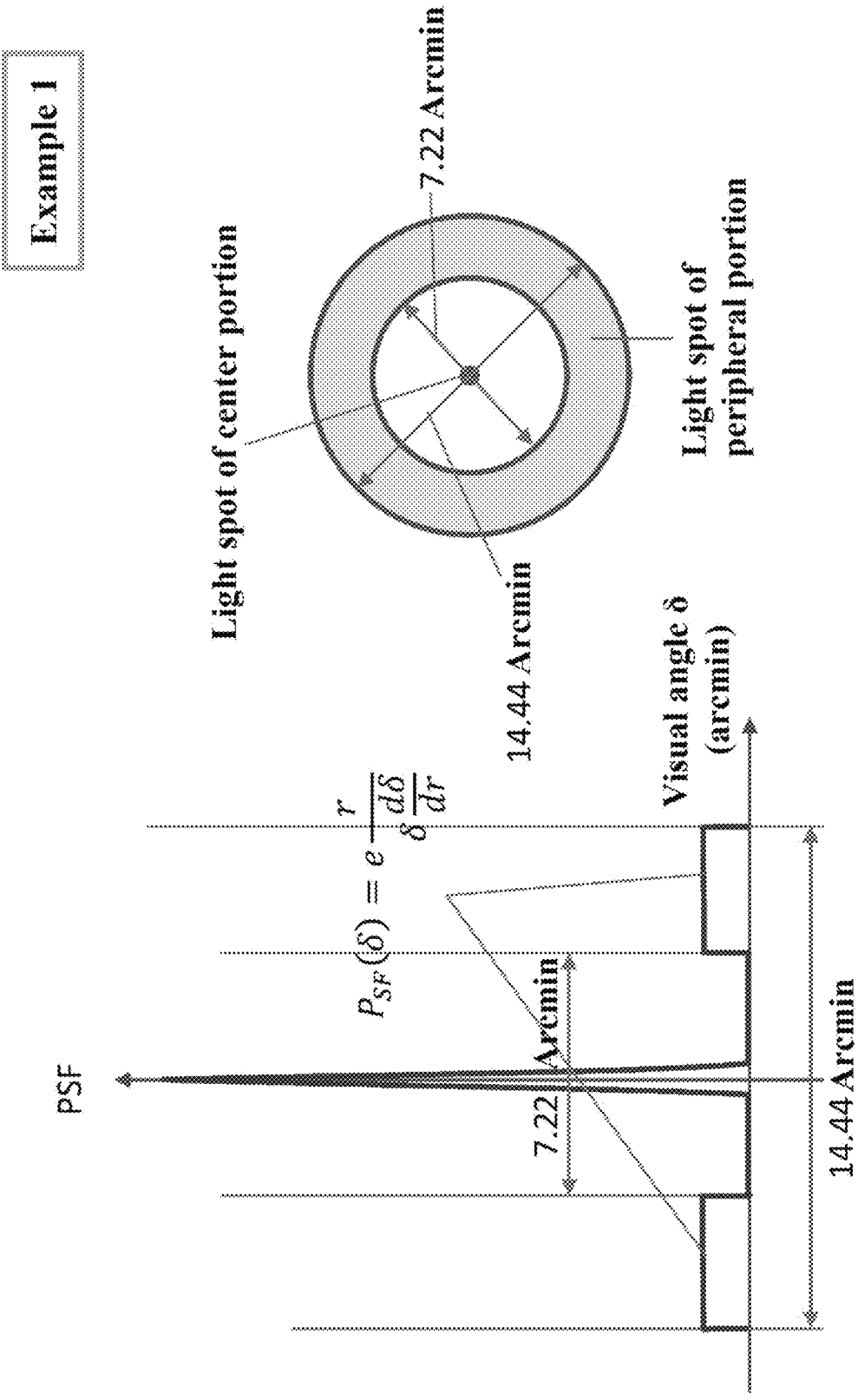
FIG. 8 is a graph of Example 1 in which the visual angle [arcmin] is plotted on the X axis, and the PSF value (light intensity density) is plotted on the Y axis.

FIG. 8 is a graph of Example 1 in which the visual angle [arcmin] is plotted on the X axis, and the PSF value (light intensity density) is plotted on the Y axis.

The visual angle is the angle between the line, other than the line of gaze, connecting an object point and the eye's entrance pupil and the line of gaze. The distance between an image of that object point on the retina and the fovea on the retina is proportional to the visual angle. Accordingly, the horizontal axis of the PSF is often the visual angle instead of a point on the retina.

The graph in FIG. 6 is also called a deviation angle curve, and the slope of the deviation angle curve corresponds to the refractive power. In Example 1, the center portion of each convex region had the same refractive power as the base region, namely 0.00 D, and the slope of the deviation angle curve was zero in the region with a radius of 0.3 mm, which was the center portion. On the other hand, the absolute value of the angle of deviation $\delta$ linearly increased in the peripheral portion. The extension of the straight line passed through the origin. This indicates that the convex region was in the shape of a spherical face and had a constant refractive power over a range from the boundary between the center portion and the peripheral portion to the boundary between the peripheral portion and the base region.

As shown in FIG. 7, the power ((refractive index−1)× curvature) of the profile curve including the axis of the convex region was constant at 0.0 D in the center portion and at 3.5 D in the peripheral portion.

As shown in FIG. 8, over a visual angle of 14.44 arcmin, the light intensity density was very high at a visual angle of zero. The light intensity density at a visual angle of zero is formed by a light flux in the center portion of the convex region with a diameter of 0.3 mm. This region, together with the base region that is not the convex regions, realizes a prescription power and forms an image at the position A on the retina.

Furthermore, as shown in FIG. 8, the light intensity density increased also in a portion in which the absolute value of the visual angle was large. This is a light intensity density resulting from diverging light. It is possible to realize the myopia progression suppressing effect by ensuring the light intensity density at a visual angle that is not zero. Moreover, in FIG. 8, the light intensity density was zero at a visual angle that was close to zero, which is preferable. That is to say, it is preferable that there is a visual angle at which the light intensity density is zero outside the light intensity density peak at a visual angle of zero (on the plus side and the minus side from the visual angle zero). Furthermore, it is preferable that the light intensity density is higher than zero outside the visual angle at which the light intensity density is zero (on the further plus side and the further minus side from the visual angle zero). The light intensity density in the PSF at a visual angle that is close to zero, that is, outside the light intensity density peak at a visual angle of zero (on the further plus side and the further minus side from the visual angle at which the light intensity density is zero) may lower the contrast of an image on the retina, and thus it can be assured that this design of the convex regions allows the wearer to see an image as an image whose contrast is unlikely to be lowered on the retina compared with the design in Patent Document 1.

Example 2

An eyeglass lens different from that of Example 1 in the following aspects was produced. In Example 2, the convex regions were in contact with each other in plan view. The configuration was the same as that of Example 1, except for the following aspects. The other conditions were as described in Example 1 and Table 1.

Shape of convex region in plan view: regular circle (diameter 0.8 mm)

Diameter of center portion of convex region: 0.54 mm

Angle of deviation at bottom of convex region (in vicinity of boundary between convex region and base region): 7.22 arcmin (corresponding to a refractive power of 5.25 D when the convex region is in the shape of a spherical face).

Pitch between convex regions (distance between centers of convex regions): 0.8 mm Number of convex regions in pupil diameter: 19

Figure 9A:
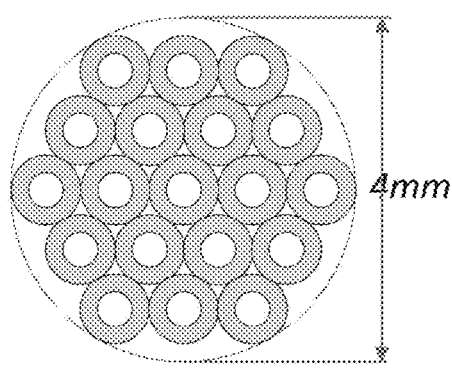
FIG. 9A is a schematic plan view showing a state of Example 2 in which convex regions are discretely arranged in a honeycomb structure and are in contact with each other in the pupil diameter.
Figure 9B:
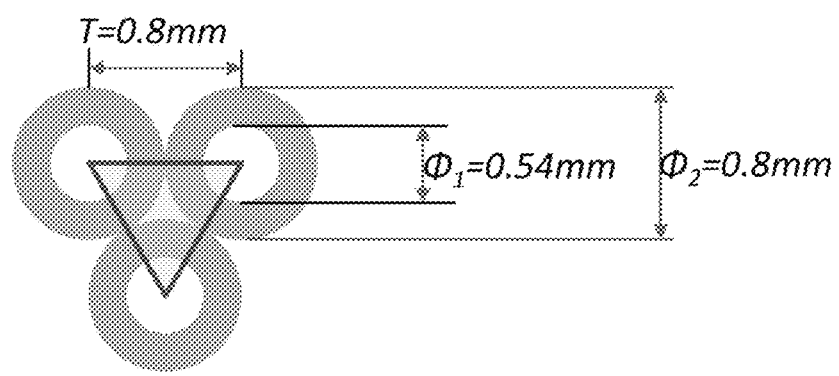
FIG. 9B is a schematic enlarged plan view showing three convex regions out of the convex regions.

FIG. 9A is a schematic plan view showing a state of Example 2 in which convex regions are discretely arranged in a honeycomb structure and are in contact with each other in the pupil diameter, indicating that 19 convex regions are arranged in a 4-mm diameter circle, which matches the pupil size. FIG. 9B is a schematic enlarged plan view showing three convex regions out of the convex regions, showing their individual sizes and the intervals. According to this design, in the triangle in FIG. 9B, (area of base region+ center portions of convex regions):(area of peripheral portions of convex regions)=50:50. That is to say, That is to say, this design is to maintain (area of prescription power region):(area of myopia progression suppressing region) at 50:50 on the lens.

Figure 10:
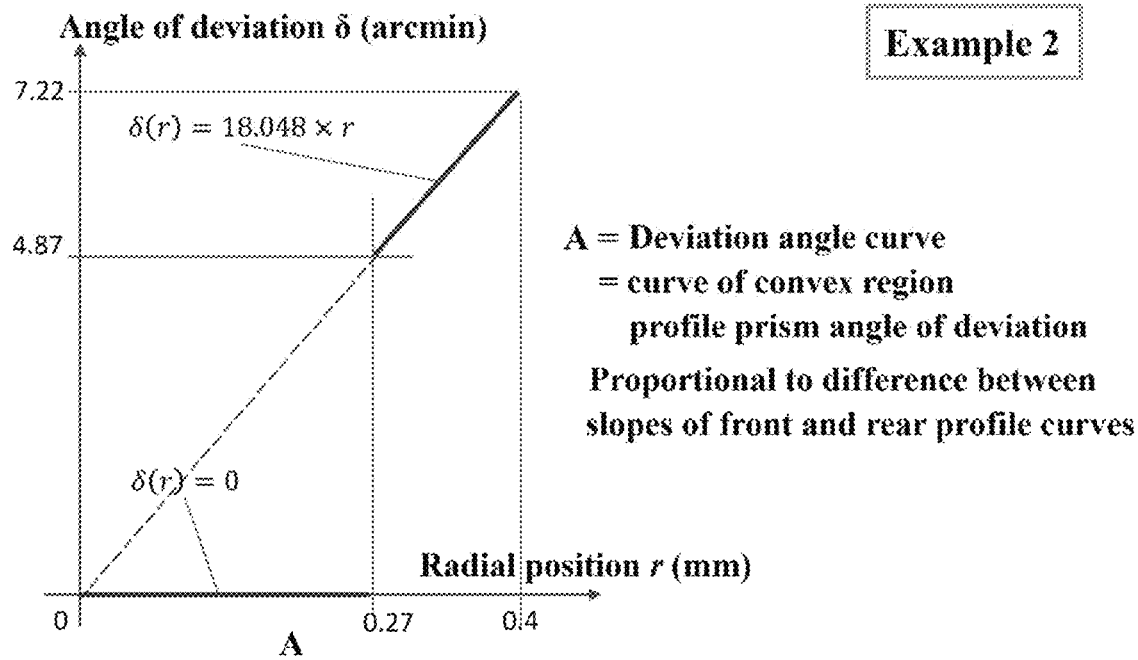
FIG. 10 is a graph of Example 2 in which the radial position [mm] from the center of a convex region is plotted on the X axis, and the angle of deviation δ [arcmin] is plotted on the Y axis.

FIG. 10 is a graph of Example 2 in which the radial position [mm] from the center of a convex region is plotted on the X axis, and the angle of deviation δ [arcmin] is plotted on the Y axis. The deviation angle function is expressed by Numerical Expression 10 below.

$$\delta(r) = \begin{cases} 0 & 0 < r < 0.27 \\ 18.048 \times r & 0.27 \le r \le 0.4 \end{cases} \quad \text{Numerical Expression 10}$$

Figure 11:
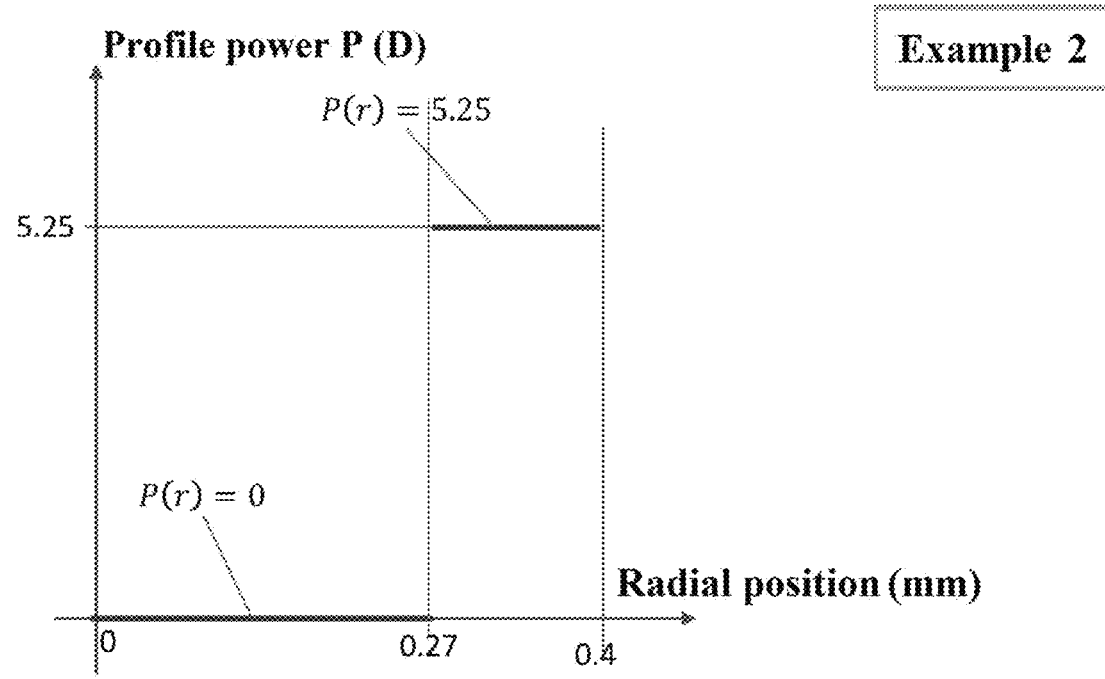
FIG. 11 is a graph of Example 2 in which the radial position [mm] from the center of a convex region is plotted on the X axis, and the profile power P [D] is plotted on the Y axis.

FIG. 11 is a graph of Example 2 in which the radial position [mm] from the center of a convex region is plotted on the X axis, and the profile power P [D] is plotted on the Y axis. The profile power function is expressed by Numerical Expression 11 below.

$$P(r) = \begin{cases} 0 & 0 < r < 0.27 \\ 5.25 & 0.27 \le r \le 0.4 \end{cases} \quad \text{Numerical Expression 11}$$

Figure 12:
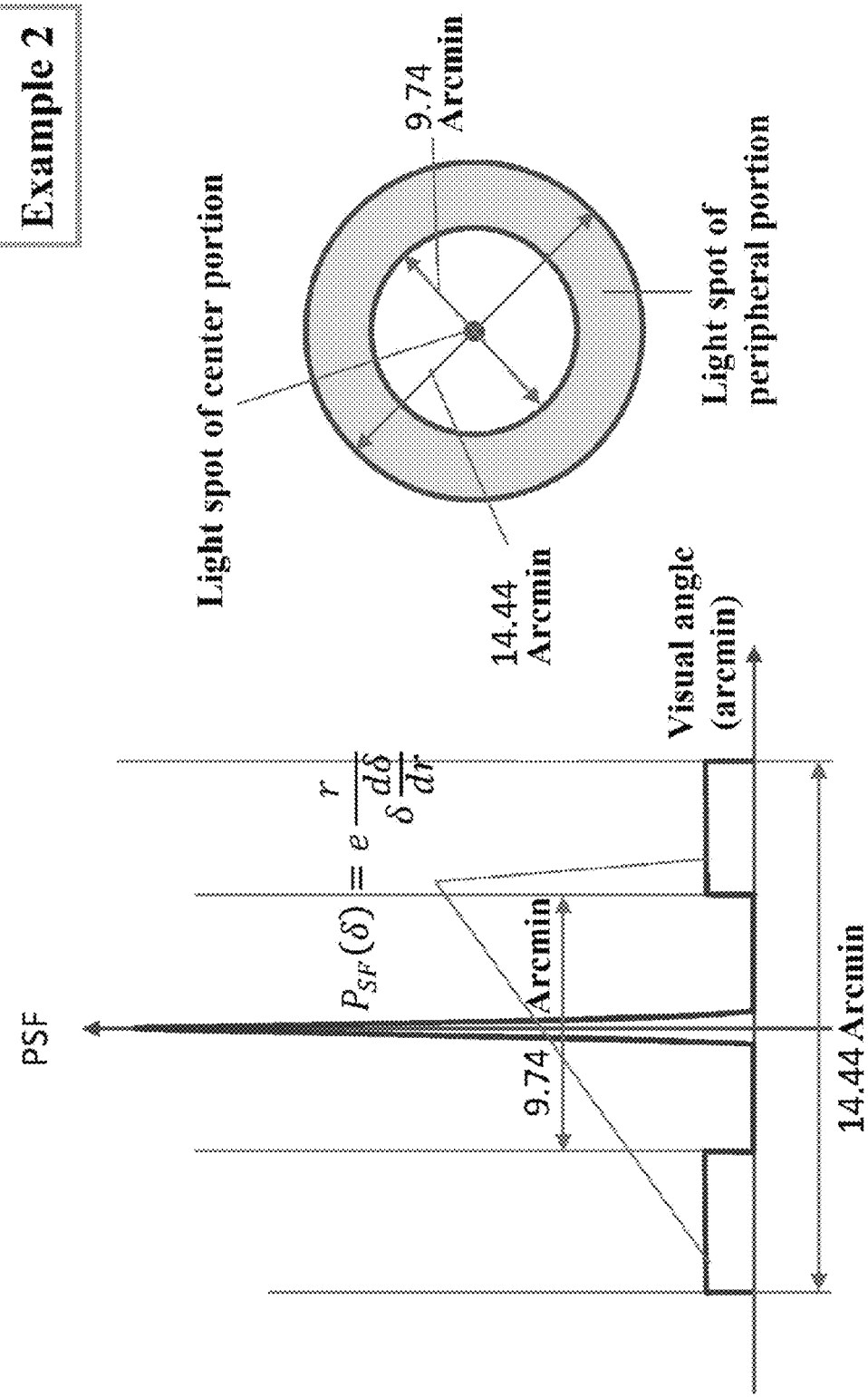
FIG. 12 is a graph of Example 2 in which the visual angle [arcmin] is plotted on the X axis, and the PSF value (light intensity density) is plotted on the Y axis.

FIG. 12 is a graph of Example 2 in which the visual angle [arcmin] is plotted on the X axis, and the PSF value (light intensity density) is plotted on the Y axis.

As shown in FIG. 12, over a visual angle of 14.44 arcmin, the light intensity density was very high at a visual angle of zero, and the light intensity density was zero at a visual angle that was close to zero. It is possible for a wearer of the eyeglass lens of Example 2 to satisfactorily see an object, as with Example 1.

Example 3

FIG. 13A is a schematic plan view showing a state of the eyeglass lens of Example 3 in which convex regions are discretely arranged in a honeycomb structure and overlap each other, and FIG. 13B is a schematic enlarged plan view showing three convex regions out of the convex regions. Adjacent circular convex regions partially overlap each other, but their common chord is taken as a boundary. If the size of the convex regions is increased and the base region between the adjacent convex regions is completely lost, the boundary between a convex region and six convex regions arranged therearound is in the shape of a regular hexagon, and each convex region is in the shape of a hexagon.

FIG. 14A is a schematic side view showing a state in which, when an eyeglass lens having a prescription power and an eyeball are collectively regarded as one optical system, an incident light flux from an infinitely distant object passes through a plurality of convex regions of the eyeglass lens of Example 3 and enters the retina, and FIG. 14B is a schematic view of an image obtained in FIG. 14A. The outer side of the peripheral portion of each convex region is hexagonal, and the boundary between the center portion and the peripheral portion is circular, and thus a light spot formed on the retina also has a shape whose outer side is hexagonal and inner side is circular.

Figure 15A:
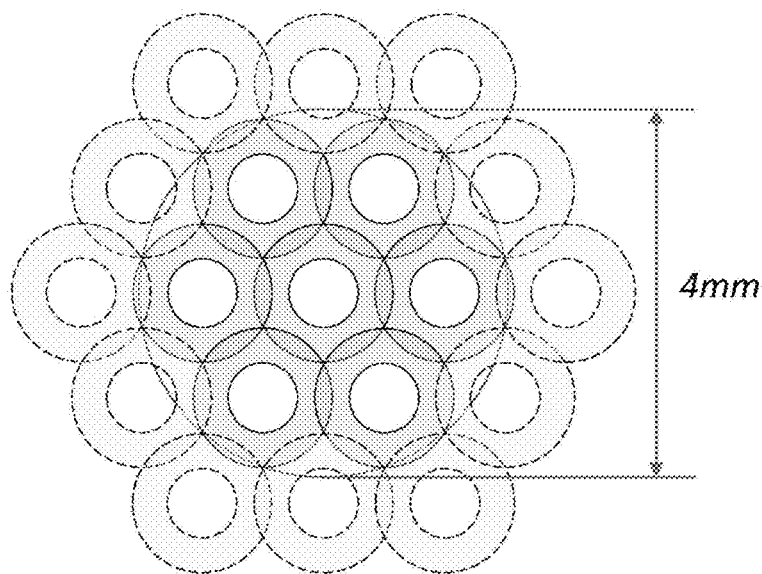
FIG. 15A is a schematic plan view showing the number and the state of convex regions arranged in a 4-mm circle (assumed pupil size) of the eyeglass lens of Example 3.
Figure 15B:
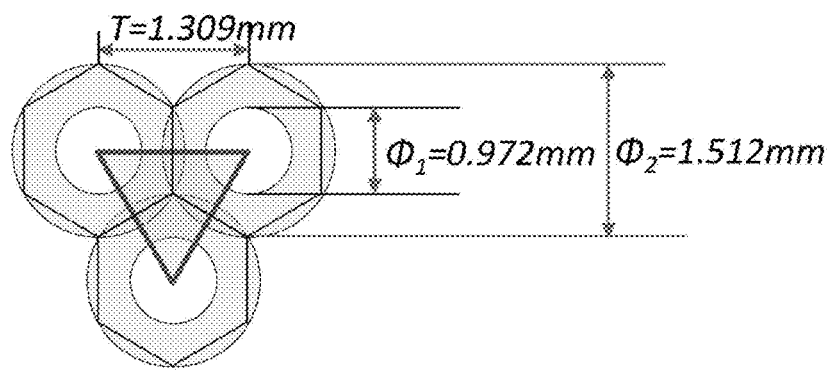
FIG. 15B is a plan view showing the size and the interval of three adjacent convex regions out of the convex regions.

FIG. 15A is a schematic plan view showing the number and the state of convex regions arranged in a 4-mm circle (assumed pupil size) of the eyeglass lens of Example 3, and FIG. 15B is a plan view showing the size and the interval of three adjacent convex regions out of the convex regions.

An eyeglass lens different from that of Example 1 in the following aspects was produced. In Example 3, the convex regions overlapped each other in plan view. The other conditions were as described in Example 1 and Table 1.

In Example 3, the size of the center portions was determined such that the area of the center portions and the area of the peripheral portions was 1:1 in the inverse triangle in FIG. 15B.

The configuration was the same as that of Example 1, except for the following aspects.

Shape of convex region in plan view: regular hexagon (diameter 1.512 mm)

Diameter of center portion of convex region: 0.972 mm

Angle of deviation at position in convex region with largest radial position (corresponding to a corner of a hexagon that is a boundary between the convex region and the base region): 9.095 arcmin (corresponding to a refractive power of 3.5 D when the convex region is in the shape of a spherical face).

Figure 16:
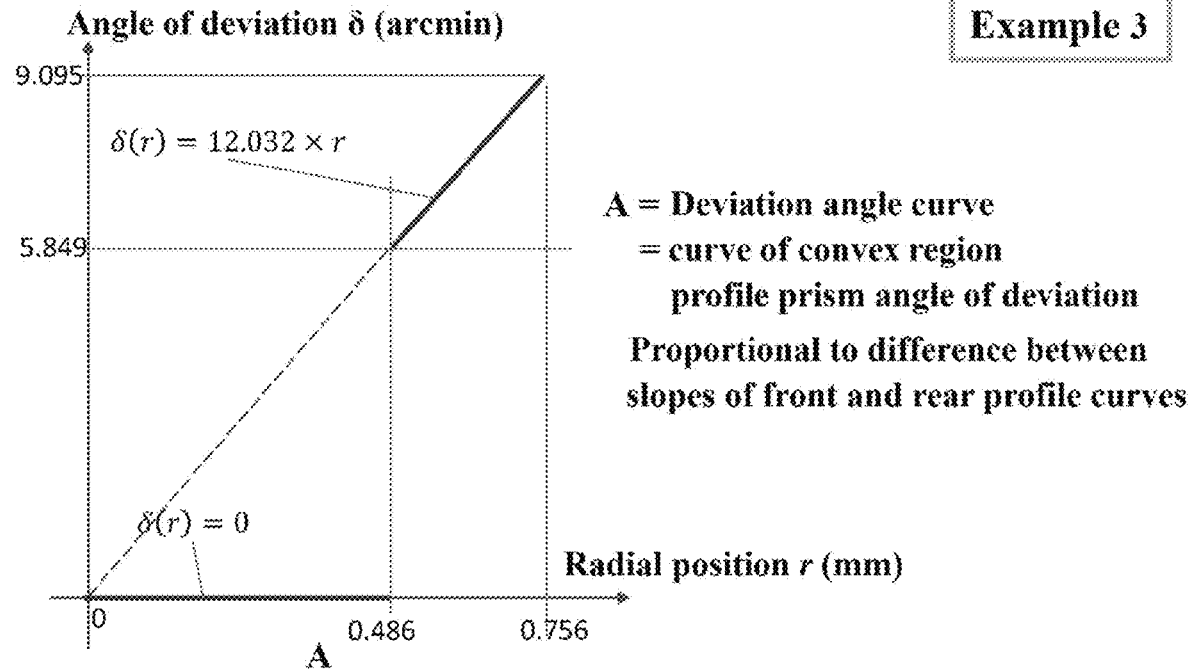
FIG. 16 is a graph of Example 3 in which the radial position [mm] from the center of a convex region is plotted on the X axis, and the angle of deviation δ [arcmin] is plotted on the Y axis.

Pitch between convex regions (distance between centers of convex regions): 1.309 mm FIG. 16 is a graph of Example 3 in which the radial position [mm] from the center of a convex region is plotted on the X axis, and the angle of deviation δ [arcmin] is plotted on the Y axis. The deviation angle function is expressed by Numerical Expression 12 below.

$$\delta(r) = \begin{cases} 0 & 0 < r < 0.486 \\ 12.032 \times r & 0.486 \leq r \leq 0.756 \end{cases}$$ Numerical Expression 12

Figure 17:
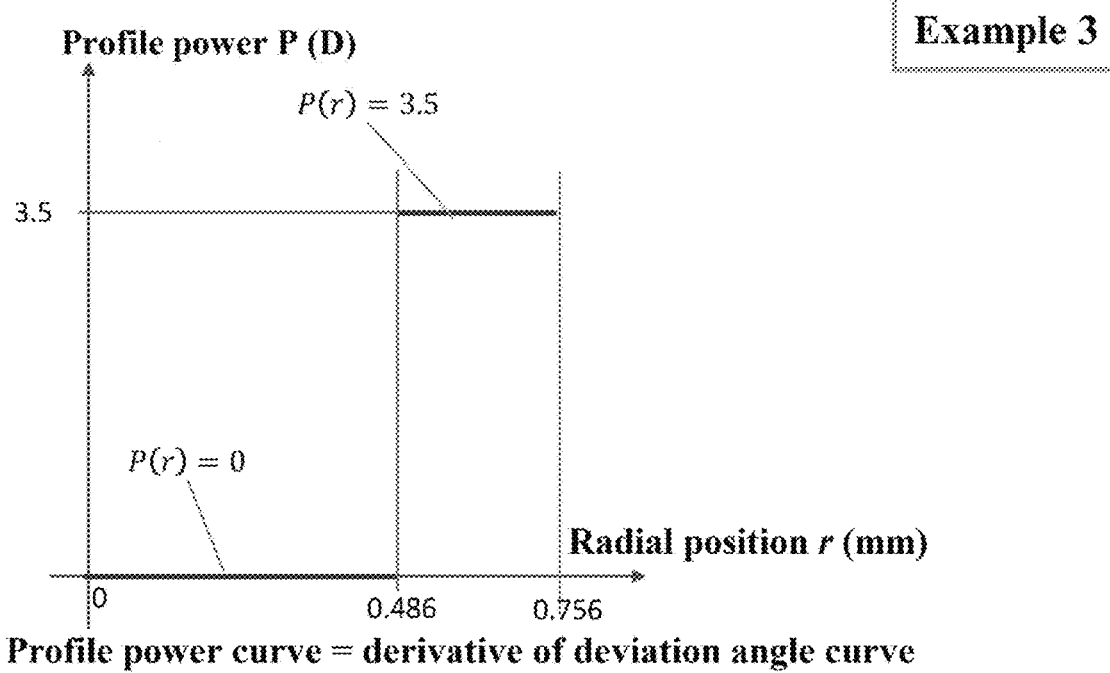
FIG. 17 is a graph of Example 3 in which the radial position [mm] from the center of a convex region is plotted on the X axis, and the profile power P [D] is plotted on the Y axis.

FIG. 17 is a graph of Example 3 in which the radial position [mm] from the center of a convex region is plotted on the X axis, and the profile power P [D] is plotted on the Y axis. The profile power function is expressed by Numerical Expression 13 below.

$$P(r) = \begin{cases} 0 & 0 < r < 0.486 \\ 3.5 & 0.486 \leq r \leq 0.756 \end{cases}$$ Numerical Expression 13

Figure 18:
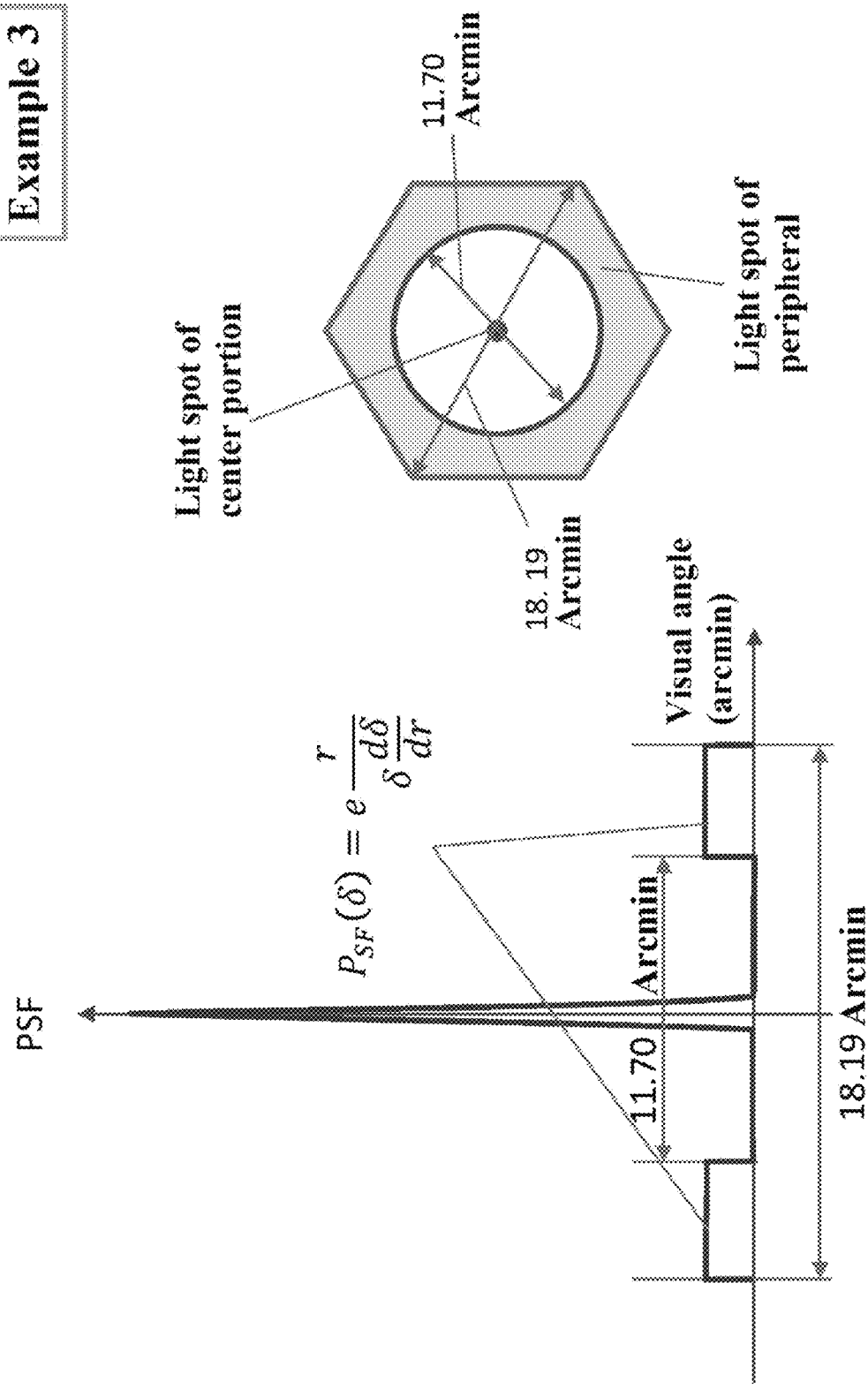
FIG. 18 is a graph of Example 3 in which the visual angle [arcmin] is plotted on the X axis, and the PSF value (light intensity density) is plotted on the Y axis.

FIG. 18 is a graph of Example 3 in which the visual angle [arcmin] is plotted on the X axis, and the PSF value (light intensity density) is plotted on the Y axis.

As shown in FIG. 18, over a visual angle of 18.19 arcmin, the light intensity density was very high at a visual angle of zero, and the light intensity density was zero at a visual angle that was close to zero. It is possible for a wearer of the eyeglass lens of Example 3 to satisfactorily see an object, as with Example 2.

Example 4

An eyeglass lens different from that of Example 1 in the following aspects was produced. In Example 4, each peripheral portion was in the shape of a rotationally symmetric aspherical face, and a curved line defining the cross-section was an arc with a constant curvature. The rotational axis of the arc was distanced from the center of the circle formed by the arc, thus forming a shape of a rotationally symmetric aspherical face. The structure of the "rotationally symmetric aspherical face" described below is as described above. The convex regions were separated from each other in plan view. The configuration was the same as that of Example 1, except for the following aspects. The other conditions were as described in Example 1 and Table 1.

Shape of peripheral portion of convex region: rotationally symmetric aspherical face (angle of outer deviation closer to the base region 10.0 arcmin, angle of inner deviation closer to the center portion 2.5 arcmin)

Interval between convex regions (distance between centers of convex regions): 1.4 mm FIG. 19A is a schematic side view showing a state in which, when an eyeglass lens having a prescription power and an eyeball are collectively regarded as one optical system, an incident light flux from an infinitely distant object passes through a plurality of convex regions of the eyeglass lens of Example 4 and enters the retina, FIG. 19B is a schematic view of an image obtained in FIG. 19A, and FIG. 19C is a schematic side view showing one convex region.

Figure 20A:
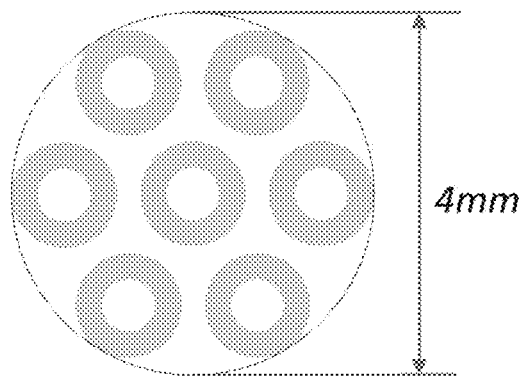
FIG. 20A is a schematic plan view showing the number and the state of convex regions arranged in a 4-mm circle (assumed pupil size) of the eyeglass lens of Example 4.
Figure 20B:
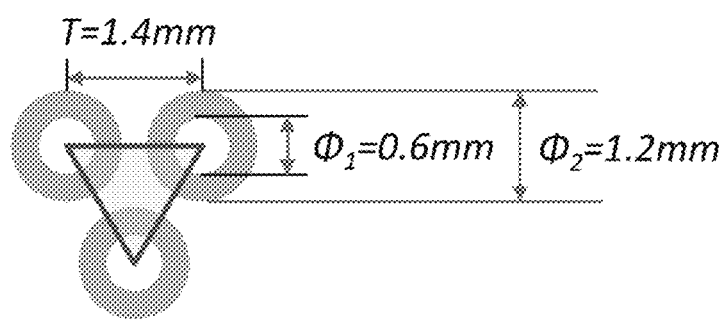
FIG. 20B is a plan view showing the size and the interval of three adjacent convex regions out of the convex regions.

FIG. 20A is a schematic plan view showing the number and the state of convex regions arranged in a 4-mm circle (assumed pupil size) of the eyeglass lens of Example 4, and FIG. 20B is a plan view showing the size and the interval of three adjacent convex regions out of the convex regions.

Figure 21:
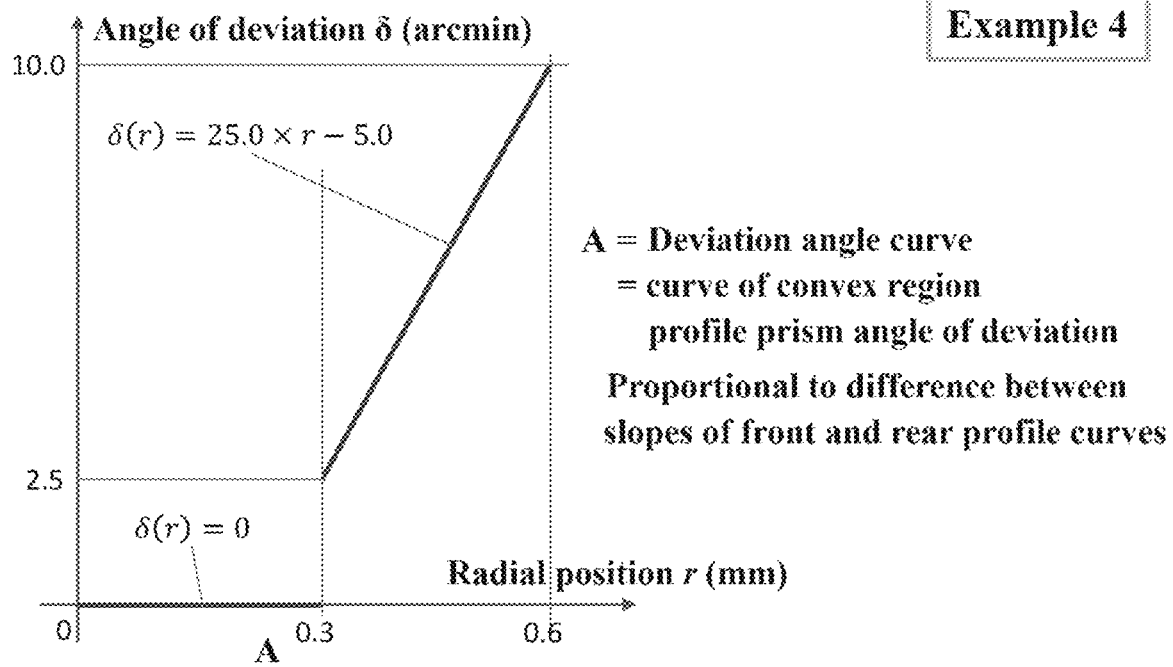
FIG. 21 is a graph of Example 4 in which the radial position [mm] from the center of a convex region is plotted on the X axis, and the angle of deviation δ [arcmin] is plotted on the Y axis.

FIG. 21 is a graph of Example 4 in which the radial position [mm] from the center of a convex region is plotted on the X axis, and the angle of deviation δ [arcmin] is plotted on the Y axis. The deviation angle function is expressed by Numerical Expression 14 below.

$$\delta(r) = \begin{cases} 0 & 0 < r < 0.3 \\ 25.0 \times r - 5.0 & 0.3 \leq r \leq 0.6 \end{cases}$$ Numerical Expression 14

Figure 22:
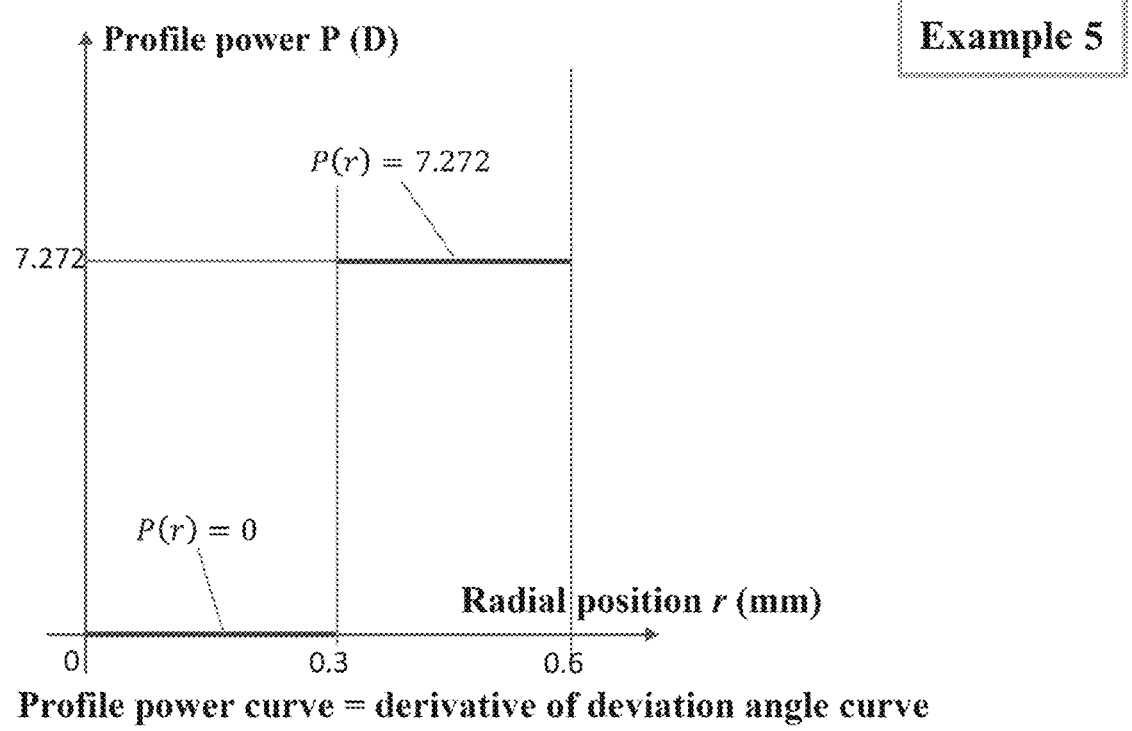
FIG. 22 is a graph of Example 4 in which the radial position [mm] from the center of a convex region is plotted on the X axis, and the profile power P [D] is plotted on the Y axis.

FIG. 22 is a graph of Example 4 in which the radial position [mm] from the center of a convex region is plotted on the X axis, and the profile power P [D] is plotted on the Y axis. The profile power function is expressed by Numerical Expression 15 below.

$$P(r) = \begin{cases} 0 & 0 < r < 0.3 \\ 7.272 & 0.3 \leq r \leq 0.6 \end{cases}$$ Numerical Expression 15

Figure 23:
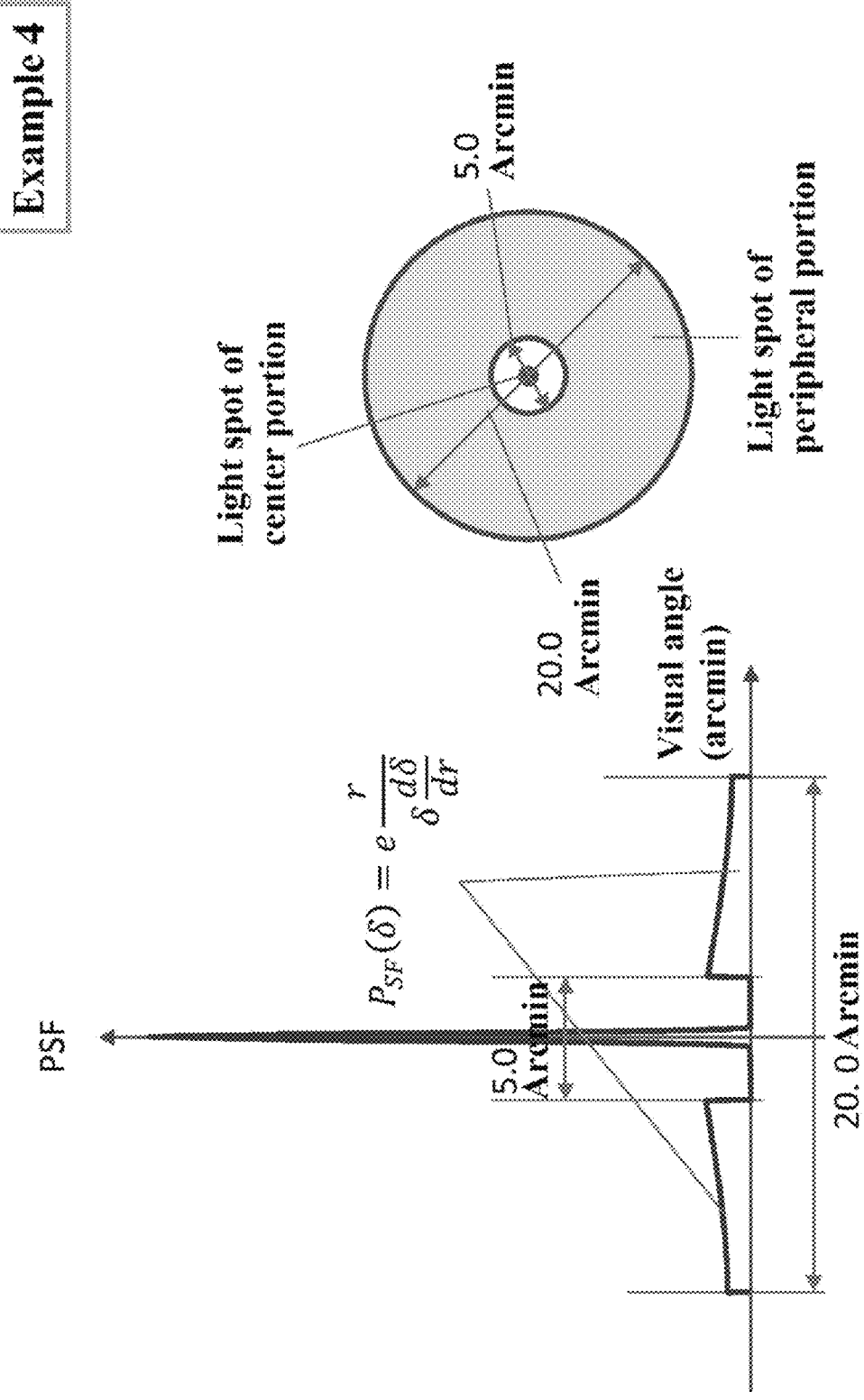
FIG. 23 is a graph of Example 4 in which the visual angle [arcmin] is plotted on the X axis, and the PSF value (light intensity density) is plotted on the Y axis.

FIG. 23 is a graph of Example 4 in which the visual angle [arcmin] is plotted on the X axis, and the PSF value (light intensity density) is plotted on the Y axis.

As shown in FIG. 23, over a visual angle of 20.0 arcmin, the light intensity density was very high at a visual angle of zero, that is, it is possible for a wearer of the eyeglass lens of Example 4 to satisfactorily see an object. Compared with the previous examples, the viewing angle width when the light intensity density was close to zero at a visual angle that was close to zero was narrower, but the light intensity density at a visual angle that was not zero was ensured, and thus it is possible to realize the myopia progression suppressing effect. Compared with Example 1, the PSF distribution radius $\delta_{0max}$ increased from 7.22 arcmin to 10.0 arcmin, that is, a higher myopia progression suppressing effect can be expected.

Example 5

An eyeglass lens different from that of Example 4 in the following aspects was produced. In Example 5, the convex regions were separated from each other in plan view. The configuration was the same as that of Example 4, except for the following aspects. The other conditions were as described in Example 4 and Table 1.

Figure 24A:
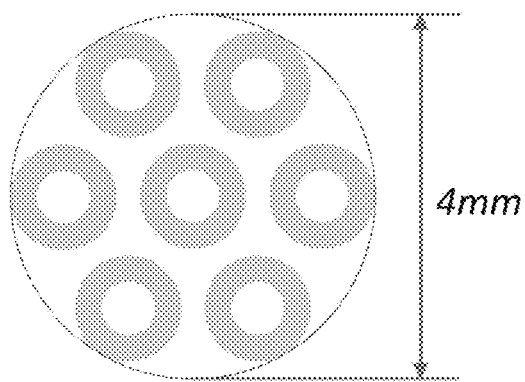
FIG. 24A is a schematic plan view showing the number and the state of convex regions arranged in a 4-mm circle (assumed pupil size) of the eyeglass lens of Example 5.
Figure 24B:
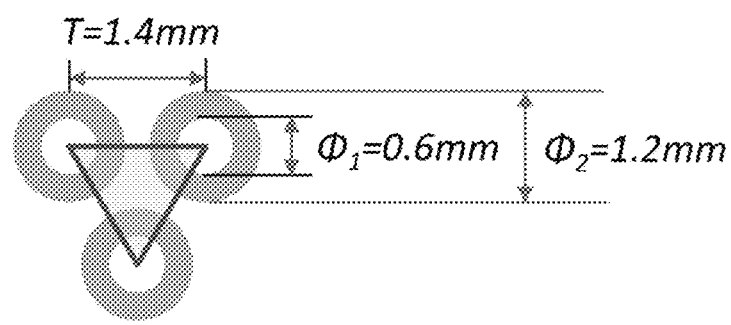
FIG. 24B is a plan view showing the size and the interval of three adjacent convex regions out of the convex regions.

FIG. 24A is a schematic plan view showing the number and the state of convex regions arranged in a 4-mm circle (assumed pupil size) of the eyeglass lens of Example 5, and FIG. 24B is a plan view showing the size and the interval of three adjacent convex regions out of the convex regions.

Figure 25:
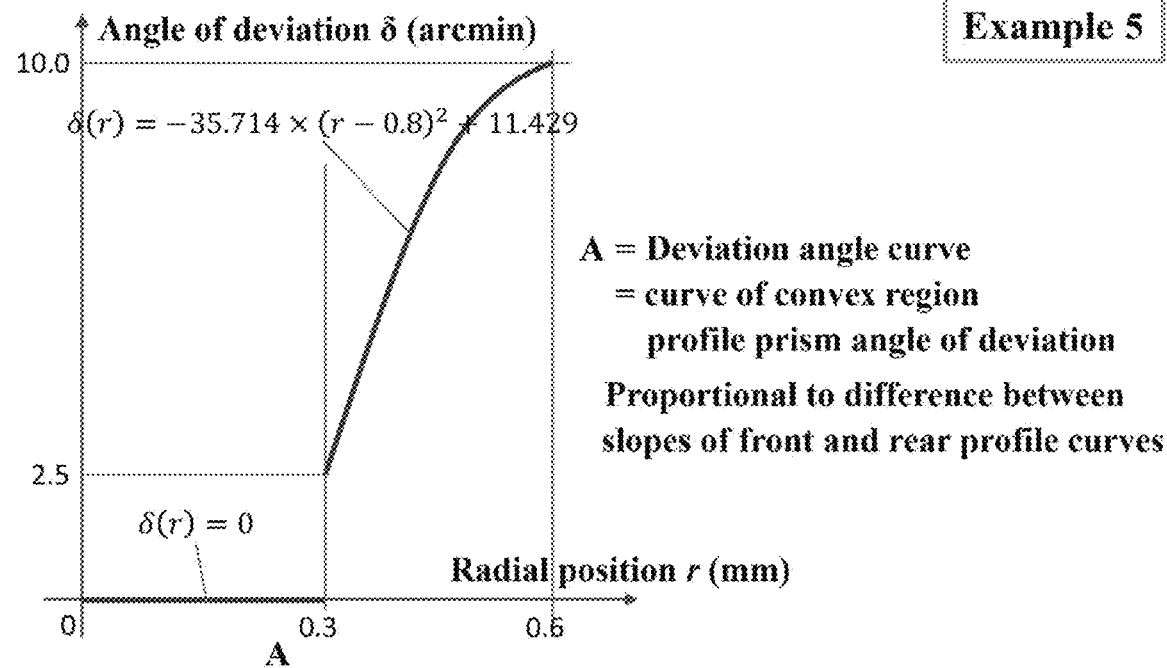
FIG. 25 is a graph of Example 5 in which the radial position [mm] from the center of a convex region is plotted on the X axis, and the angle of deviation δ [arcmin] is plotted on the Y axis.

FIG. 25 is a graph of Example 4 in which the radial position [mm] from the center of a convex region is plotted on the X axis, and the angle of deviation δ [arcmin] is plotted on the Y axis. The deviation angle function is expressed by Numerical Expression 16 below.

$$\delta(r) = \begin{cases} 0 & 0 < r < 0.3 \\ -35.714 \times (r - 0.8)^2 + 11.429 & 0.3 \le r \le 0.6 \end{cases}$$

Numerical Expression 16

Figure 26:
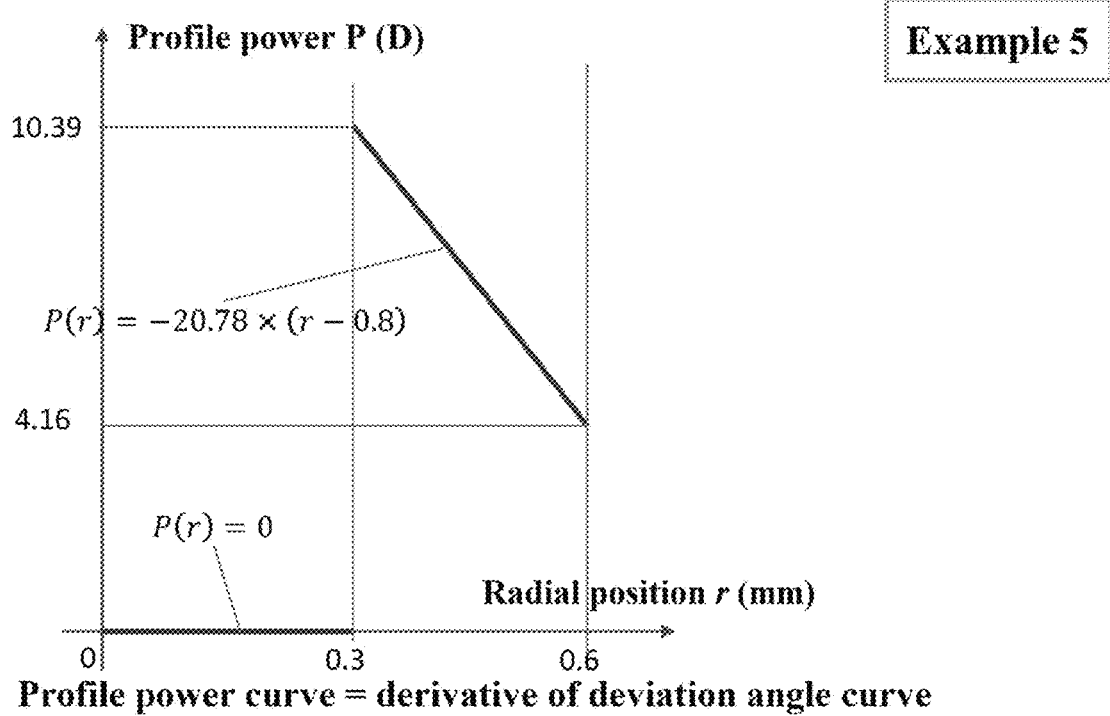
FIG. 26 is a graph of Example 5 in which the radial position [mm] from the center of a convex region is plotted on the X axis, and the profile power P [D] is plotted on the Y axis.

FIG. 26 is a graph of Example 4 in which the radial position [mm] from the center of a convex region is plotted on the X axis, and the profile power P [D] is plotted on the Y axis. The profile power function is expressed by Numerical Expression 17 below.

$$P(r) = \begin{cases} 0 & 0 < r < 0.3 \\ -20.78 \times (r - 0.8) & 0.3 \le r \le 0.6 \end{cases}$$

Numerical Expression 17

Figure 27:
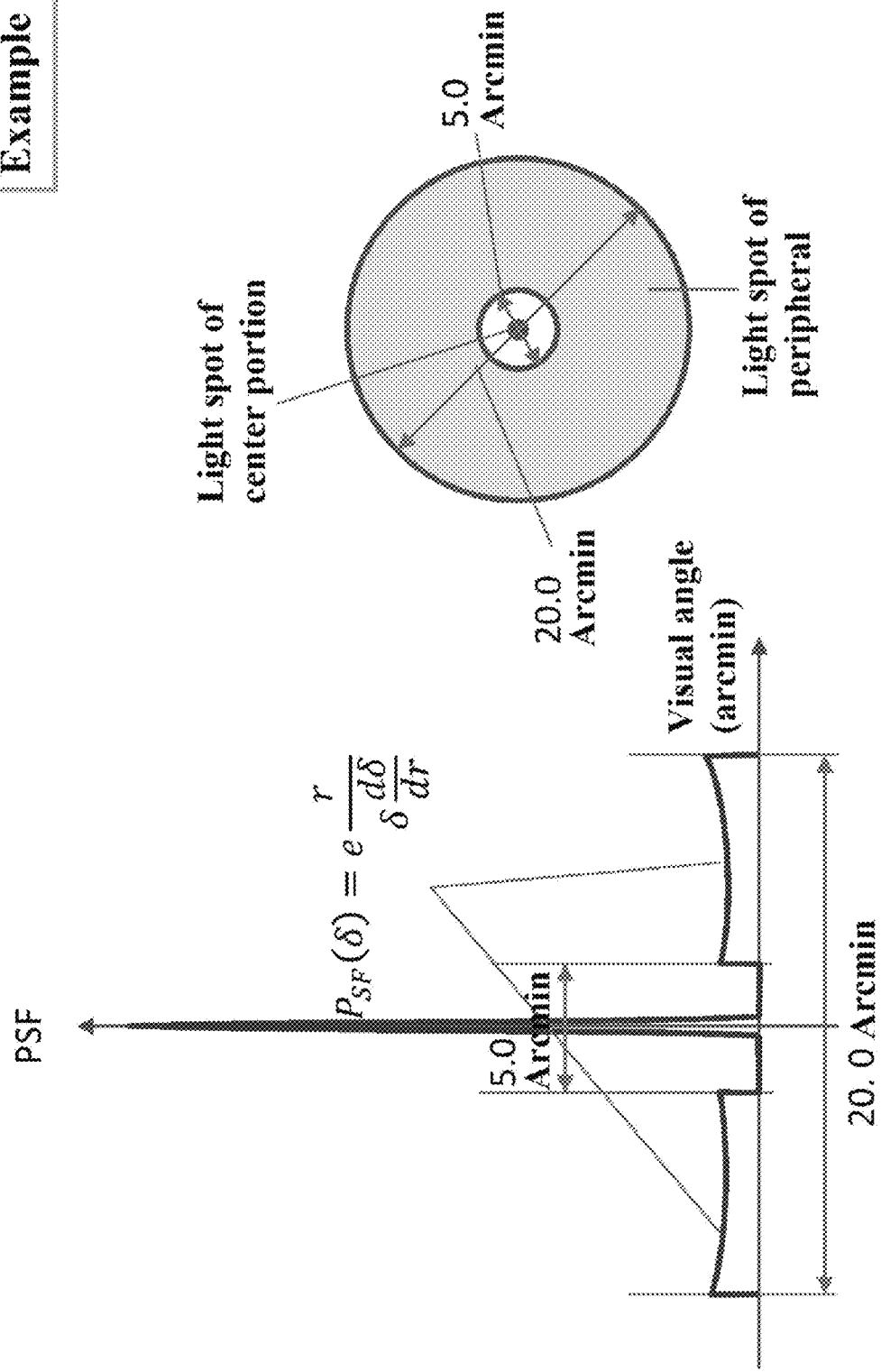
FIG. 27 is a graph of Example 5 in which the visual angle [arcmin] is plotted on the X axis, and the PSF value (light intensity density) is plotted on the Y axis.

FIG. 27 is a graph of Example 5 in which the visual angle [arcmin] is plotted on the X axis, and the PSF value (light intensity density) is plotted on the Y axis.

As shown in FIG. 27, over a visual angle of 20.0 arcmin, the light intensity density was very high at a visual angle of zero, that is, it is possible for a wearer of the eyeglass lens of Example 5 to satisfactorily see an object. Compared with the previous examples, the viewing angle width when the light intensity density was close to zero at a visual angle that was close to zero was narrower, but the light intensity density at a visual angle that was not zero was ensured, and thus it is possible to realize the myopia progression suppressing effect. Compared with Example 4, the PSF distribution radius $\delta_{0max}$ was 10.0 arcmin, that is, the same, but the distribution in the peripheral portions was high and flat on the whole. Accordingly, a change in the size of the light intensity distribution on the retina can be easily perceived, and the myopia progression suppressing effect can be expected to be improved.

Example 6

In Example 6, an eyeglass lens different from that of Example 4 in the following aspects was produced.

The convex regions overlapped each other in plan view.

The number of convex regions arranged in a 4-mm diameter circle was kept at 7 while increasing the size of the convex regions.

Figures 28A, 28B:
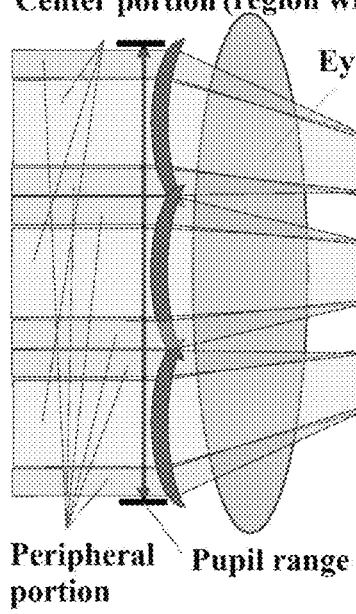
FIG. 28A is a schematic side view showing a state in which, when an eyeglass lens having a prescription power and an eyeball are collectively regarded as one optical system, an incident light flux from an infinitely distant object passes through a plurality of convex regions of the eyeglass lens of Example 6 and enters the retina.
FIG. 28B is a schematic view of an image obtained in FIG. 28A.

FIG. 28A is a schematic side view showing a state in which, when an eyeglass lens having a prescription power and an eyeball are collectively regarded as one optical system, an incident light flux from an infinitely distant object passes through a plurality of convex regions of the eyeglass lens of Example 6 and enters the retina, and FIG. 28B is a schematic view of an image obtained in FIG. 28A.

Figure 29A:
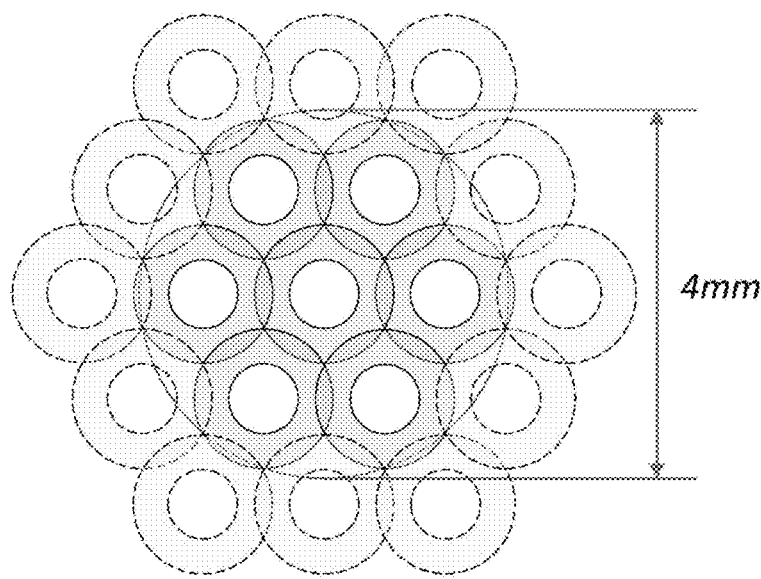
FIG. 29A is a schematic plan view showing the number and the state of convex regions arranged in a 4-mm circle (assumed pupil size) of the eyeglass lens of Example 6.
Figure 29B:
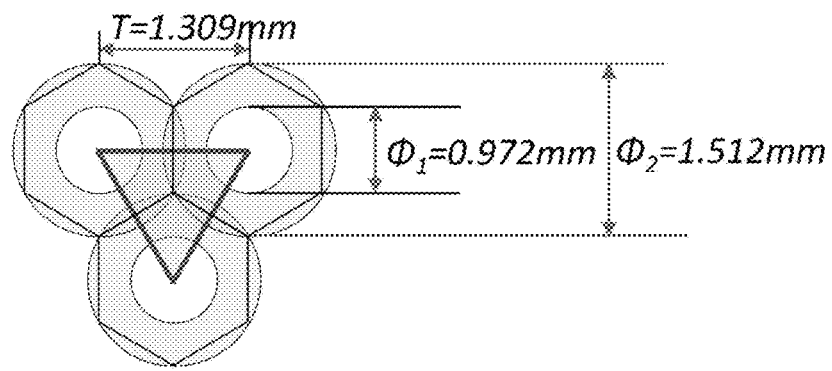
FIG. 29B is a plan view showing the size and the interval of three adjacent convex regions out of the convex regions.

FIG. 29A is a schematic plan view showing the number and the state of convex regions arranged in a 4-mm circle (assumed pupil size) of the eyeglass lens of Example 6, and FIG. 29B is a plan view showing the size and the interval of three adjacent convex regions out of the convex regions.

In Example 6, the size of the center portions was determined such that the area of the center portions and the area of the peripheral portions was 1:1 in the inverse triangle in FIG. 15B of Example 3 (the same applies to the inverse triangle hereinafter).

The configuration was the same as that of Example 4, except for the following aspects.

Shape of convex region in plan view: regular hexagon (largest diameter 1.512 mm)

Diameter of center portion of convex region: 0.972 mm

Shape of peripheral portion of convex region: symmetric aspherical face obtained by rotating an arc shape, with a profile power of 12.936 D (angle of outer deviation closer to the base region 15.0 arcmin, angle of inner deviation closer to the center portion 3.0 arcmin)

Figure 30:
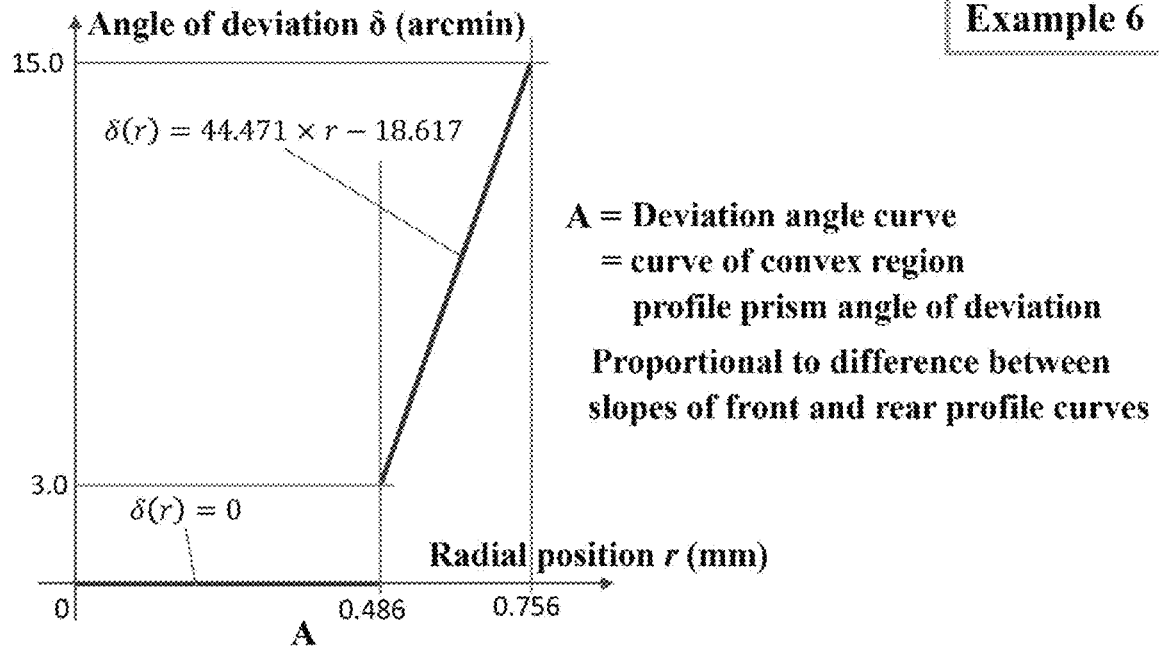
FIG. 30 is a graph of Example 6 in which the radial position [mm] from the center of a convex region is plotted on the X axis, and the angle of deviation δ [arcmin] is plotted on the Y axis.

Pitch between convex regions (distance between centers of convex regions): 1.309 mm FIG. 30 is a graph of Example 6 in which the radial position [mm] from the center of a convex region is plotted on the X axis, and the angle of deviation δ [arcmin] is plotted on the Y axis. The deviation angle curve is expressed by Numerical Expression 18 below.

$$\delta(r) = \begin{cases} 0 & 0 < r < 0.486 \\ 44.471 \times r - 18.617 & 0.486 \le r \le 0.756 \end{cases}$$

Numerical Expression 18

Figure 31:
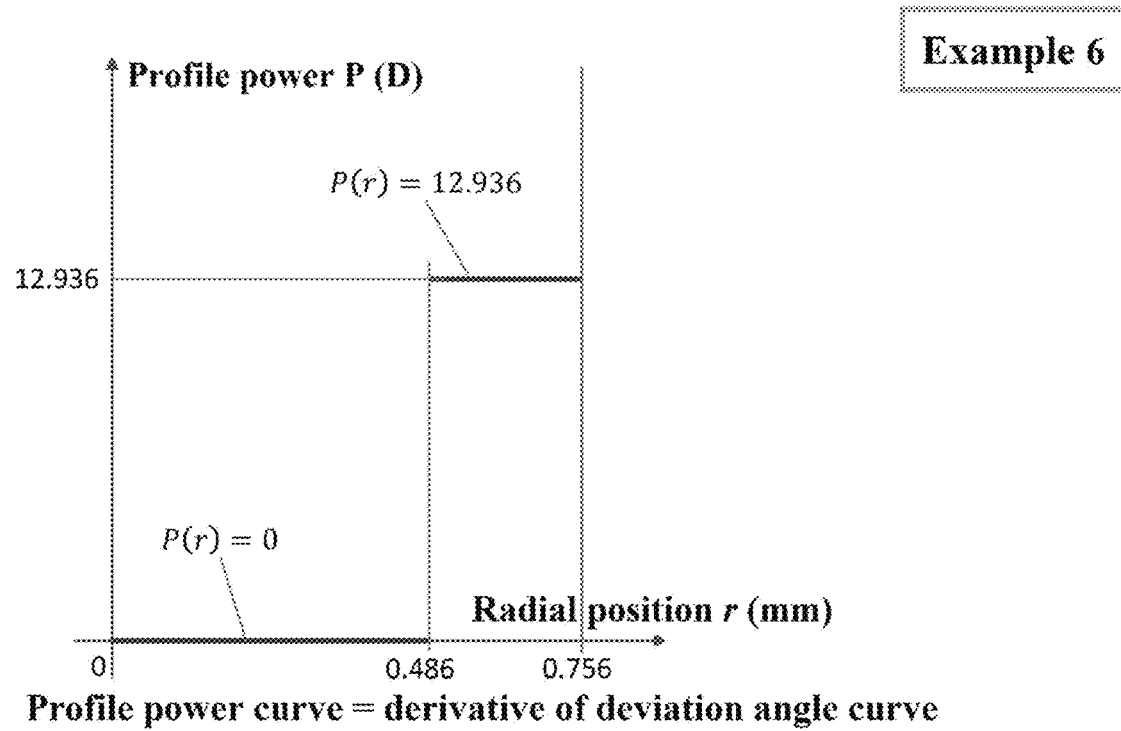
FIG. 31 is a graph of Example 6 in which the radial position [mm] from the center of a convex region is plotted on the X axis, and the profile power P [D] is plotted on the Y axis.

FIG. 31 is a graph of Example 6 in which the radial position [mm] from the center of a convex region is plotted on the X axis, and the profile power P [D] is plotted on the Y axis. The profile power curve is expressed by Numerical Expression 19 below.

$$P(r) = \begin{cases} 0 & 0 < r < 0.486 \\ 12.936 & 0.486 \le r \le 0.756 \end{cases}$$

Numerical Expression 19

Figure 32:
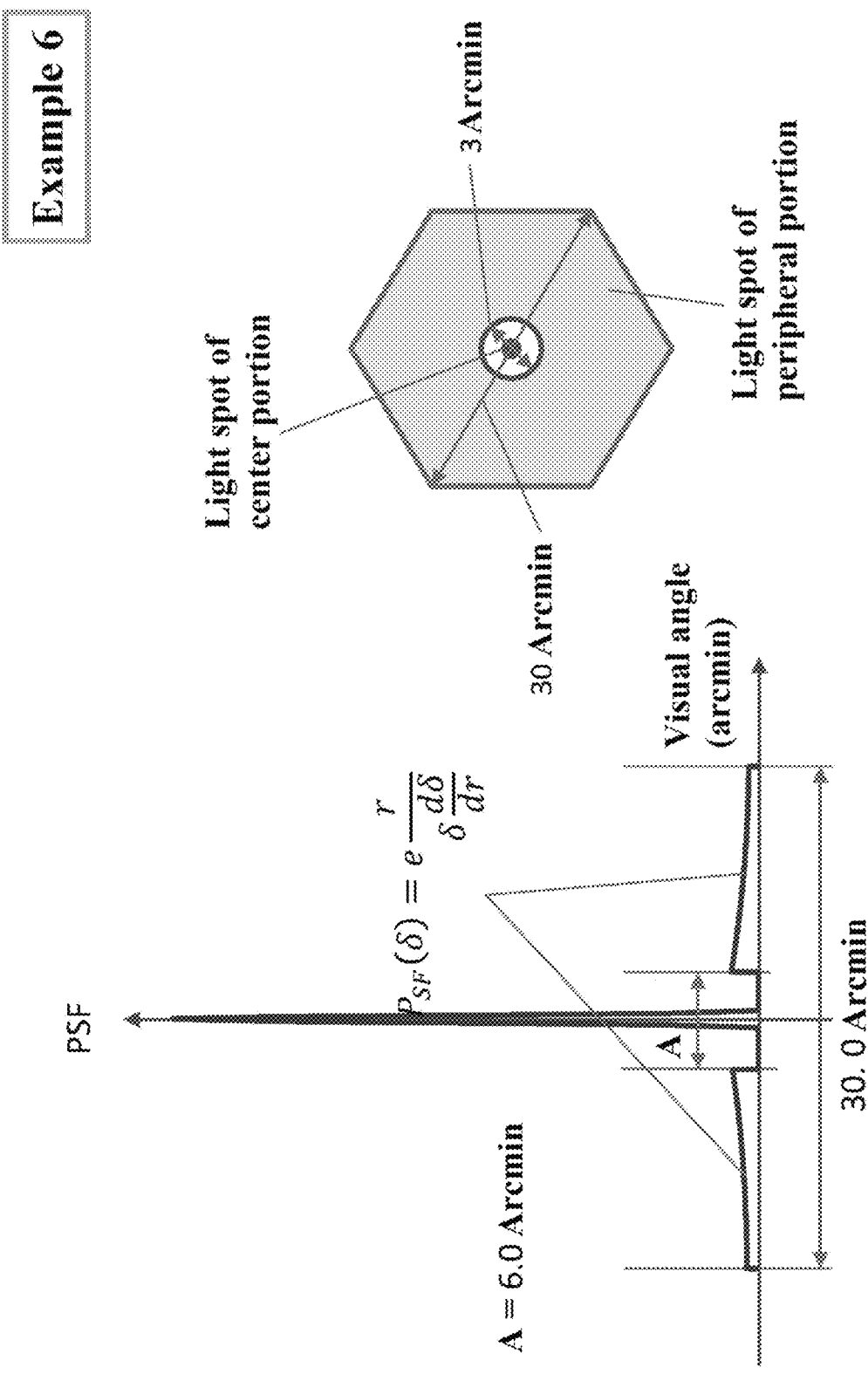
FIG. 32 is a graph of Example 6 in which the visual angle [arcmin] is plotted on the X axis, and the PSF value (light intensity density) is plotted on the Y axis.

FIG. 32 is a graph of Example 6 in which the visual angle [arcmin] is plotted on the X axis, and the PSF value (light intensity density) is plotted on the Y axis.

As shown in FIG. 32, over a visual angle of 30.0 arcmin, the light intensity density was very high at a visual angle of zero, that is, it is possible for a wearer of the eyeglass lens of Example 6 to satisfactorily see an object. Compared with the previous examples, the viewing angle width when the light intensity density was close to zero at a visual angle that was close to zero was narrower, but the light intensity density at a visual angle that was not zero was ensured, and thus it is possible to realize the myopia progression suppressing effect.

Example 7

Example 7 is different from Example 6 in the following aspects.

Shape of peripheral portion of convex region: rotationally symmetric aspherical face with a cross-section defined by a curved line whose curvature changes (angle of outer deviation closer to the base region 15.0 arcmin, angle of inner deviation closer to the center portion 3.0 arcmin)

The other conditions were as described in Example 6 and Table 1.

Figure 33A:
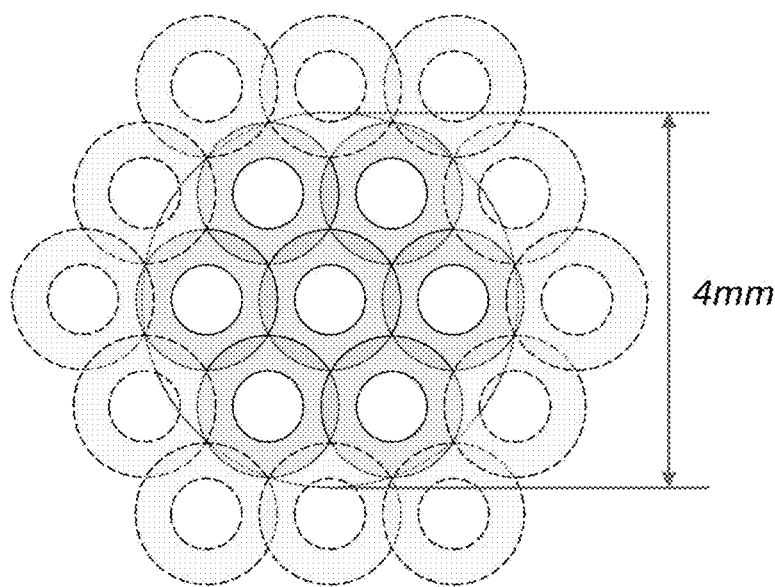
FIG. 33A is a schematic plan view showing the number and the state of convex regions arranged in a 4-mm circle (assumed pupil size) of the eyeglass lens of Example 7.
Figure 33B:
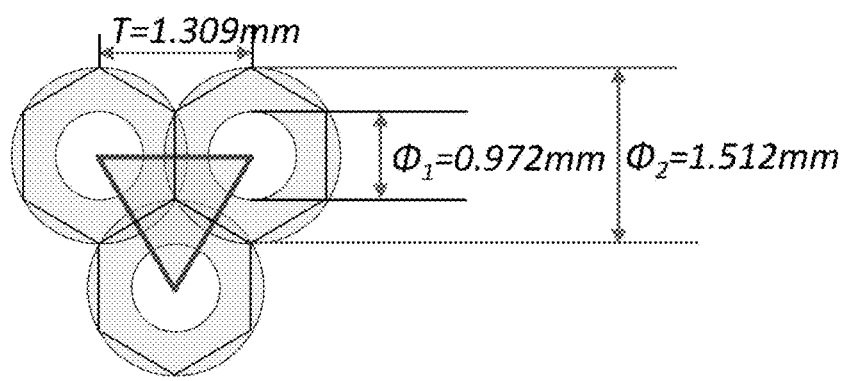
FIG. 33B is a plan view showing the size and the interval of three adjacent convex regions out of the convex regions.

FIG. 33A is a schematic plan view showing the number and the state of convex regions arranged in a 4-mm circle (assumed pupil size) of the eyeglass lens of Example 7, and FIG. 33B is a plan view showing the size and the interval of three adjacent convex regions out of the convex regions.

In Example 7, the size of the center portions was determined such that the area of the center portions and the area of the peripheral portions was 1:1 in the inverse triangle in FIG. 15B of Example 3 (the same applies to the inverse triangle hereinafter).

Figure 34:
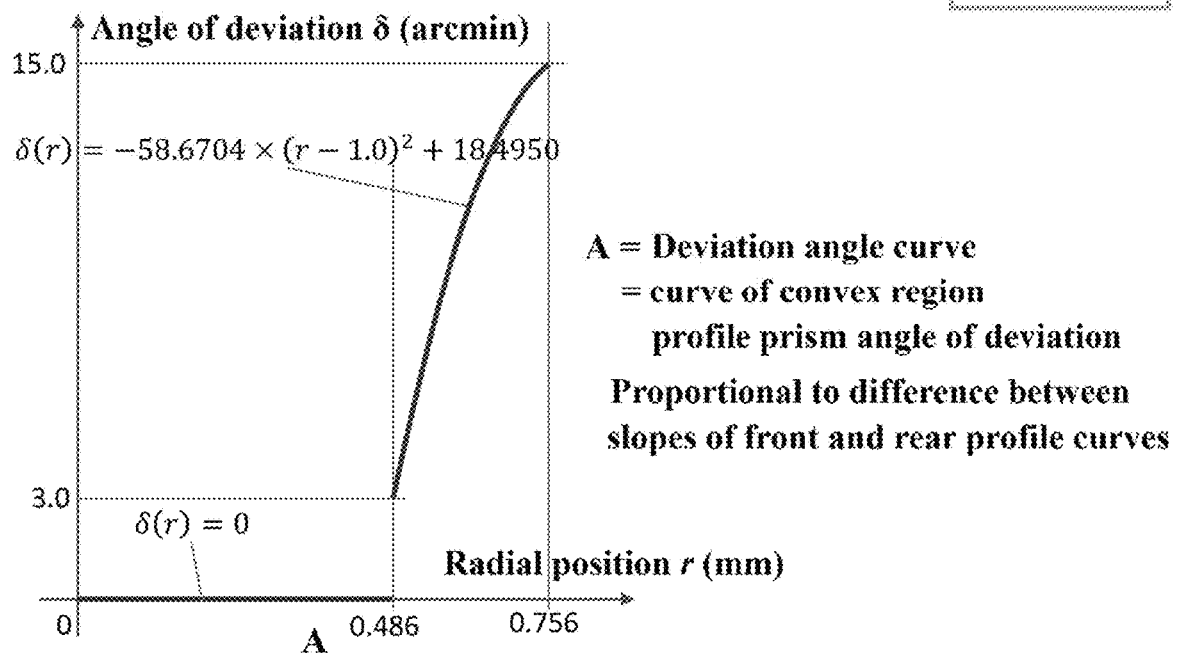
FIG. 34 is a graph of Example 7 in which the radial position [mm] from the center of a convex region is plotted on the X axis, and the angle of deviation δ [arcmin] is plotted on the Y axis.

FIG. 34 is a graph of Example 7 in which the radial position [mm] from the center of a convex region is plotted on the X axis, and the angle of deviation δ [arcmin] is plotted on the Y axis. The deviation angle curve is expressed by Numerical Expression 20 below.

$$\delta(r) = \begin{cases} 0 & 0 < r < 0.486 \\ -58.6704 \times (r - 1.0)^2 + 18.4950 & 0.486 \leq r \leq 0.756 \end{cases}$$

Numerical Expression 20

Figure 35:
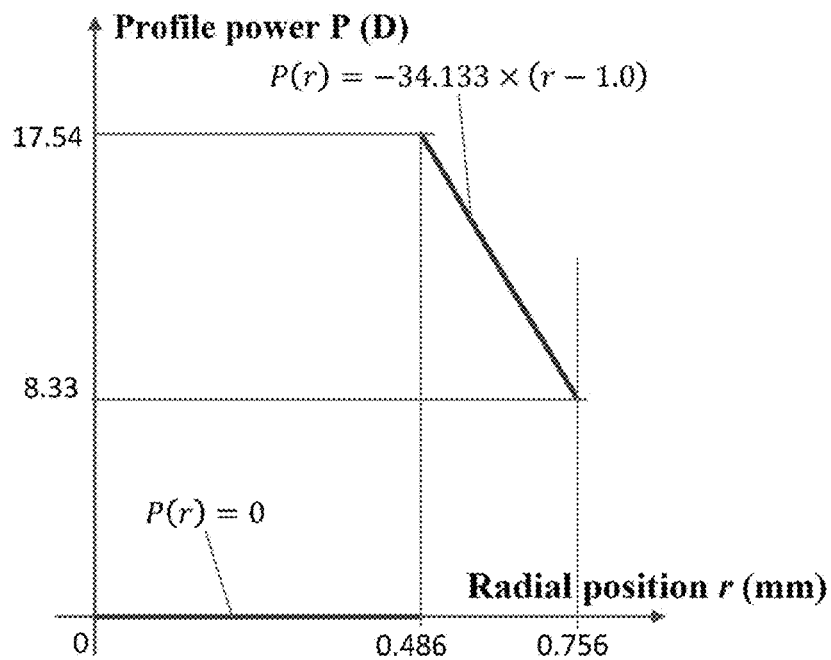
FIG. 35 is a graph of Example 7 in which the radial position [mm] from the center of a convex region is plotted on the X axis, and the profile power P [D] is plotted on the Y axis.

FIG. 35 is a graph of Example 7 in which the radial position [mm] from the center of a convex region is plotted on the X axis, and the profile power P [D] is plotted on the Y axis. The profile power curve is expressed by Numerical Expression 21 below.

$$P(r) = \begin{cases} 0 & 0 < r < 0.486 \\ -34.133 \times (r - 1.0) & 0.486 \leq r \leq 0.756 \end{cases}$$

Numerical Expression 21

Figure 36:
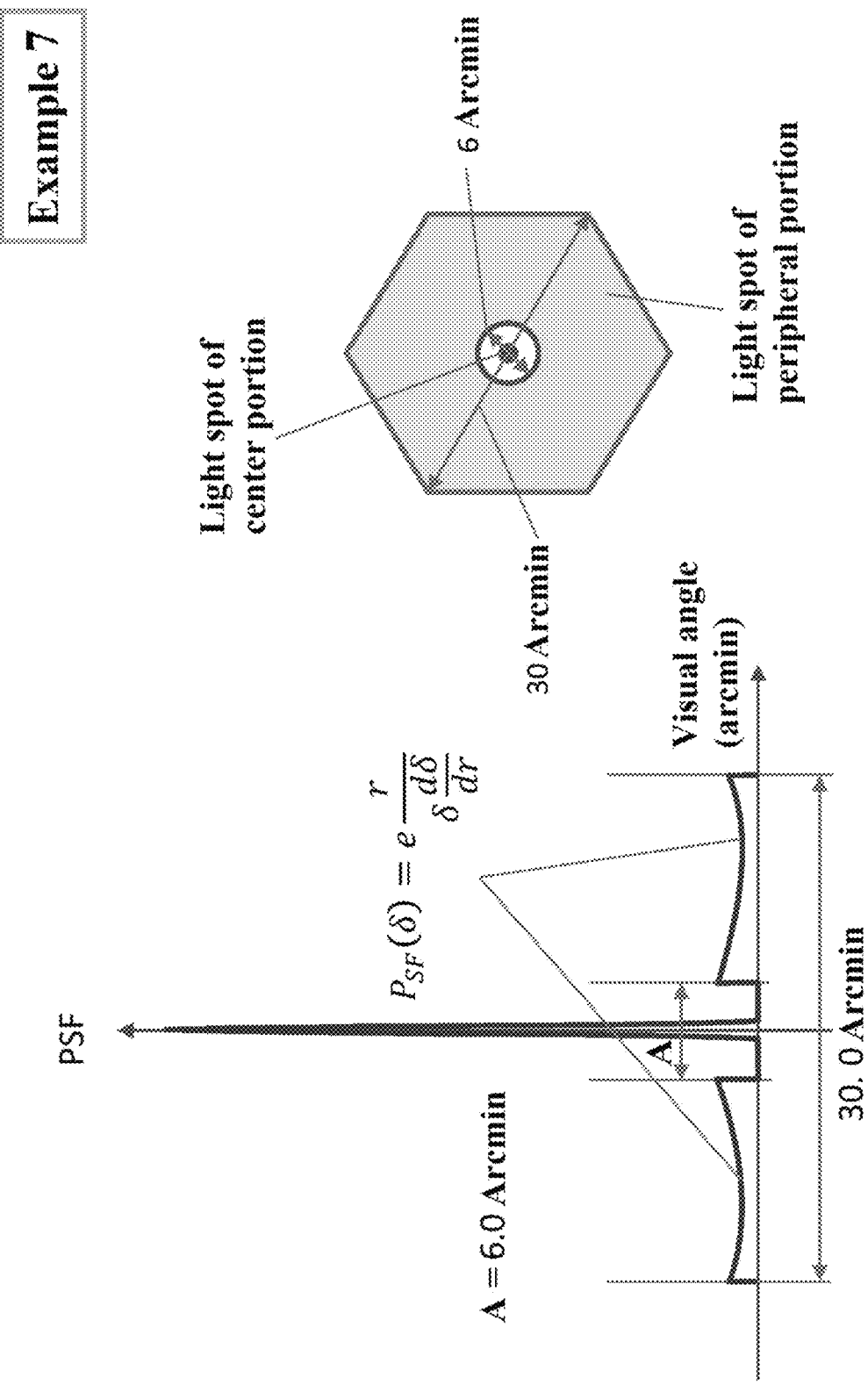
FIG. 36 is a graph of Example 7 in which the visual angle [arcmin] is plotted on the X axis, and the PSF value (light intensity density) is plotted on the Y axis.

FIG. 36 is a graph of Example 7 in which the visual angle [arcmin] is plotted on the X axis, and the PSF value (light intensity density) is plotted on the Y axis.

As shown in FIG. 36, visual angle diameter 30.0 arcmin, the light intensity density was very high at a visual angle of zero, that is, it is possible for a wearer of the eyeglass lens of Example 7 to satisfactorily see an object. Compared with the previous examples, the viewing angle width when the light intensity density was close to zero at a visual angle that was close to zero was narrower, but the light intensity density at a visual angle that was not zero was ensured, and thus it is possible to realize the myopia progression suppressing effect. Compared with Example 6, the PSF distribution radius $\delta_{0max}$ was 15.0 arcmin, that is, the same, but the distribution in the peripheral portions was high and flat on the whole. Accordingly, a change in the size of the light intensity distribution on the retina can be easily perceived, and the myopia progression suppressing effect can be expected to be improved.

Example 8

Example 8 is different from Example 7 in the following aspects.

The number of convex regions arranged in a 4-mm diameter circle on the lens was 19.

Shape of convex region in plan view: regular hexagon (largest diameter 0.9177 mm)

Diameter of center portion of convex region: 0.5901 mm

Shape of peripheral portion of convex region: rotationally symmetric aspherical face with a cross-section defined by a curved line whose curvature changes (angle of outer deviation closer to the base region 10.0 arcmin, angle of inner deviation closer to the center portion 2.0 arcmin)

Pitch between convex regions (distance between centers of convex regions): 0.7947 mm The other conditions were as described in Example 7 and Table 1.

FIG. 37A is a schematic plan view showing the number and the state of convex regions arranged in a 4-mm circle (assumed pupil size) of the eyeglass lens of Example 8, and FIG. 37B is a plan view showing the size and the interval of three adjacent convex regions out of the convex regions.

In Example 7, the size of the center portions was determined such that the area of the center portions and the area of the peripheral portions was 1:1 in the inverse triangle in FIG. 15B of Example 3 (the same applies to the inverse triangle hereinafter).

Figure 38:
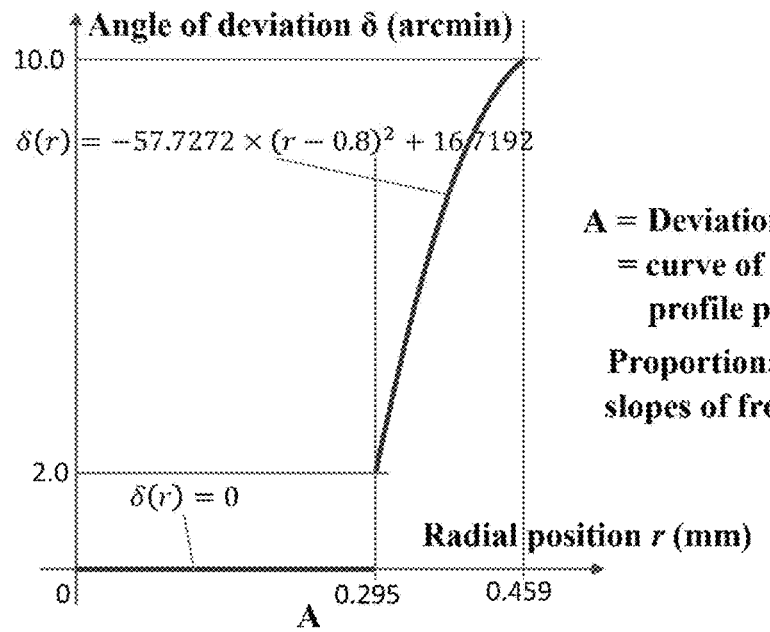
FIG. 38 is a graph of Example 8 in which the radial position [mm] from the center of a convex region is plotted on the X axis, and the angle of deviation δ [arcmin] is plotted on the Y axis.

FIG. 38 is a graph of Example 8 in which the radial position [mm] from the center of a convex region is plotted on the X axis, and the angle of deviation δ [arcmin] is plotted on the Y axis. The deviation angle curve is expressed by Numerical Expression 22 below.

$$\delta(r) = \begin{cases} 0 & 0 < r < 0.295 \\ -57.7272 \times (r - 0.8)^2 + 16.7192 & 0.295 \leq r \leq 0.459 \end{cases}$$

Numerical Expression 22

Figure 39:
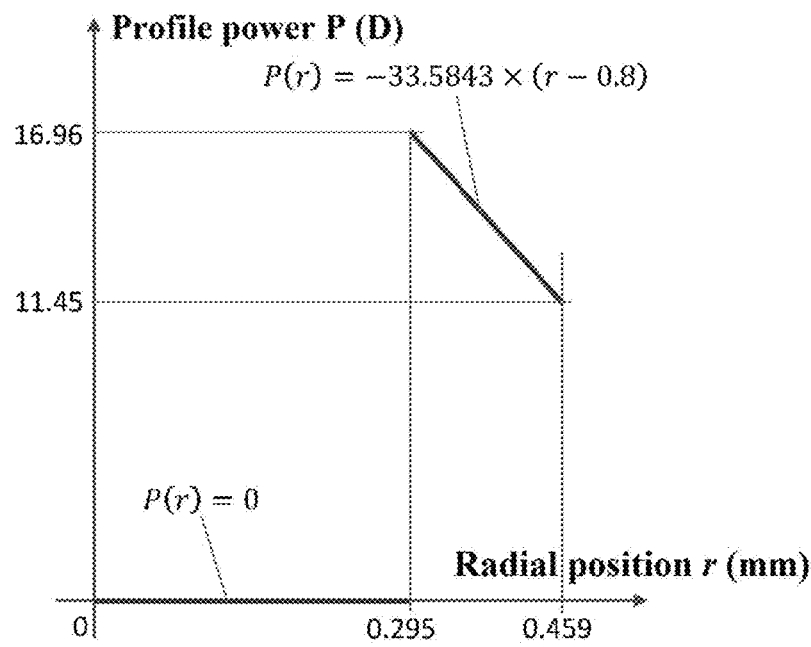
FIG. 39 is a graph of Example 8 in which the radial position [mm] from the center of a convex region is plotted on the X axis, and the profile power P [D] is plotted on the Y axis.

FIG. 39 is a graph of Example 8 in which the radial position [mm] from the center of a convex region is plotted on the X axis, and the profile power P [D] is plotted on the Y axis. The profile power curve is expressed by Numerical Expression 23 below.

$$P(r) = \begin{cases} 0 & 0 < r < 0.295 \\ -33.5843 \times (r - 0.8) & 0.295 \leq r \leq 0.459 \end{cases}$$

Numerical Expression 23

Figure 40:
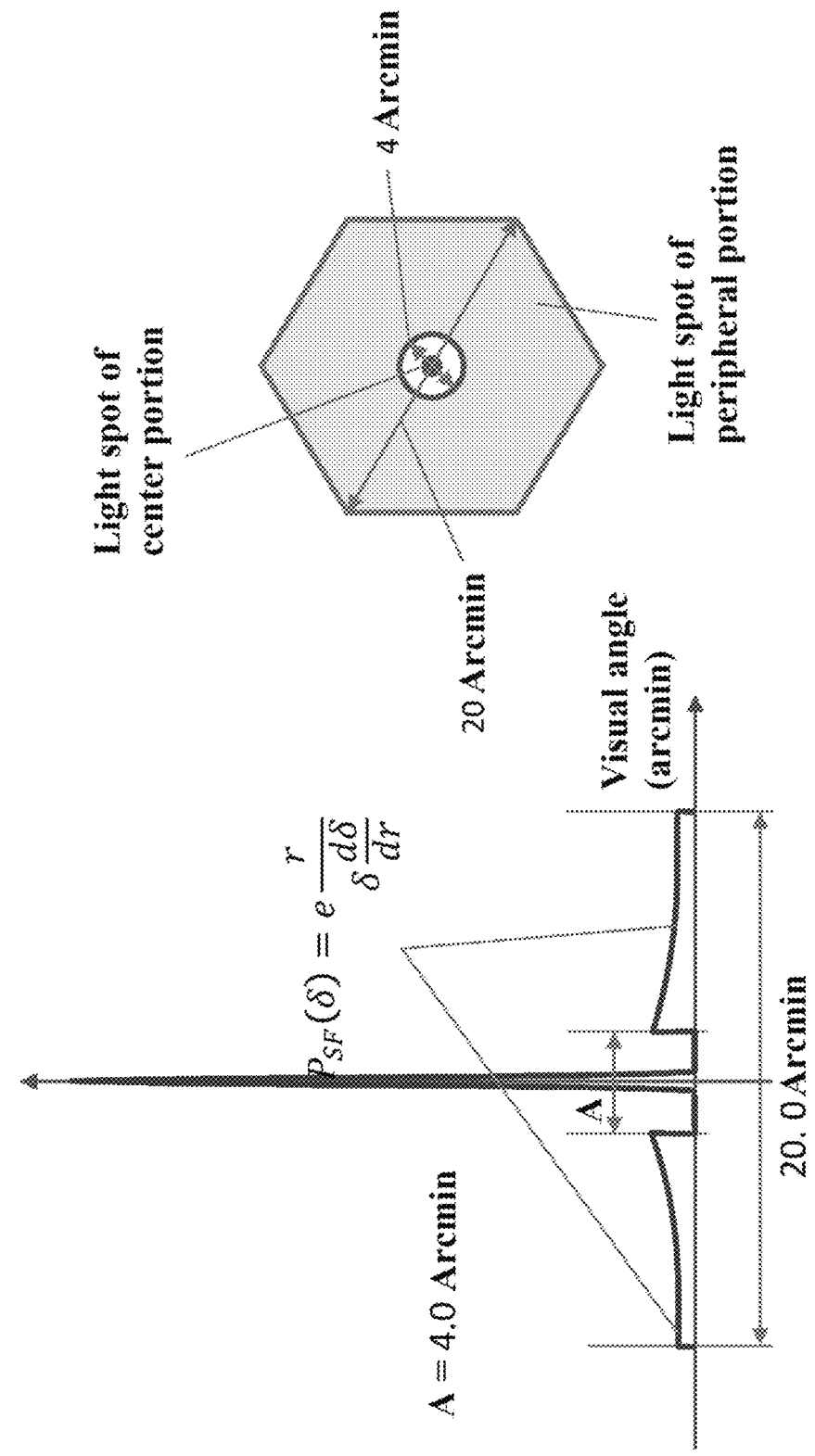
FIG. 40 is a graph of Example 8 in which the visual angle [arcmin] is plotted on the X axis, and the PSF value (light intensity density) is plotted on the Y axis.

FIG. 40 is a graph of Example 8 in which the visual angle [arcmin] is plotted on the X axis, and the PSF value (light intensity density) is plotted on the Y axis.

As shown in FIG. 40, over a visual angle diameter of 20.0 arcmin, the light intensity density was very high at a visual angle of zero, that is, it is possible for a wearer of the eyeglass lens of Example 8 to satisfactorily see an object. Compared with the previous examples, the viewing angle width when the light intensity density was close to zero at a visual angle that was close to zero was narrower, but the light intensity density at a visual angle that was not zero was ensured, and thus it is possible to realize the myopia progression suppressing effect. As with Example 7, the PSF distribution in the peripheral portions was high and flat on the whole. Accordingly, a change in the size of the light intensity distribution on the retina can be easily perceived, and the myopia progression suppressing effect can be expected to be improved. Compared with Example 7, the number of convex regions arranged in the pupil size was large. Accordingly, less fluctuation of light felt occurs when the wearer's line of sight moves, which is expected to improve the comfort.

In the PSF calculations in the above examples, the eyeglass and an eyeball model are regarded as a single ideal optical system, and all rays are also calculated using the paraxial approximation. Although the actual eye's optical system has aberrations and the situation is more complex, the basic relationships such as the case in which diverging light enters a retina, the direction of a change in the size caused by accommodative microfluctuations, and the like do not change significantly.

Figure 41A:
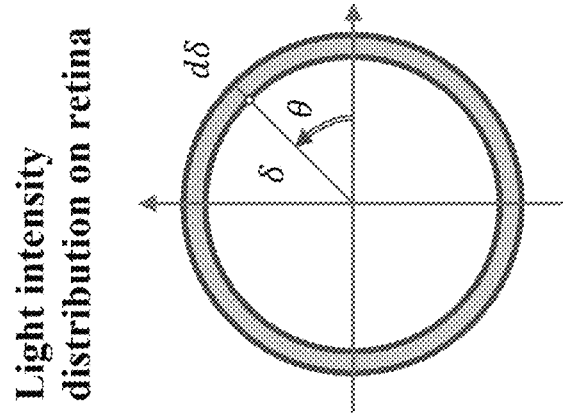
FIGS. 41A-41C are explanatory diagrams for calculating PSF.
Figure 41B:
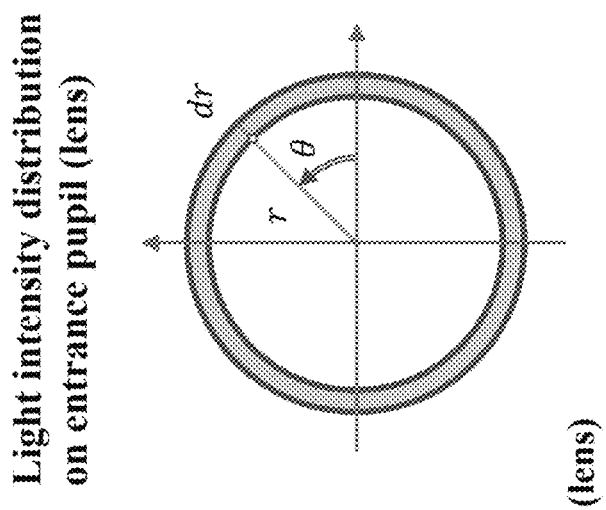
Figure 41C:
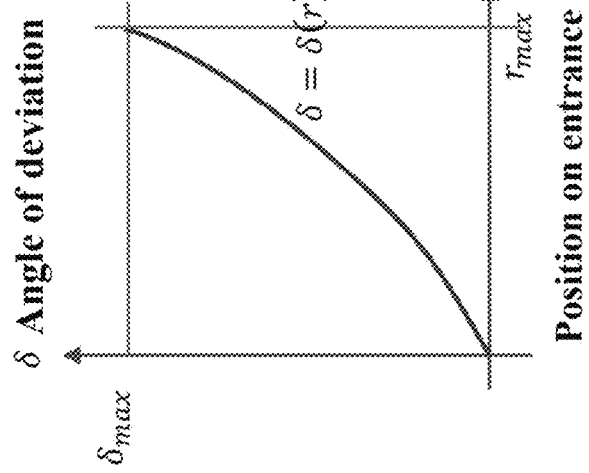

FIGS. 41A-41C are explanatory diagrams for calculating PSF.

Specifically, FIG. 41A is an explanatory graph in which, when a radial position r from the center of an entrance pupil (i.e., the center on the eyeglass lens) is plotted on the X axis, and the angle of deviation δ is plotted on the Y axis, δ monotonically increases in accordance with an increase in r. FIGS. 14B and 41C are diagrams for deriving the relationship between the intensity density of light that enters a convex region and the light intensity density of a light spot on the retina.

In FIG. 41B, when the light intensity density of the evenly distributed light intensity in an entrance pupil (convex region) is taken as e, the area of the ring-like region in the dr range at the position r is 2πrdr, and the light intensity in that region is 2πredr.

In FIG. 41C, the area of the ring in the dδ range at the position δ in the deviation angle coordinate system at the position r is 2πδdδ, and thus the light intensity density is (2πredr)/(2πδdδ)=e×r/(δ(dδ/dr)).

As a result, PSF is expressed by the following expression.

$$P_{SF}(\delta) = e \frac{r}{\delta \frac{d\delta}{dr}}$$ Numerical Expression 24

The invention claimed is:

1. An eyeglass lens comprising:
 a base region that causes a light flux that has entered from an object-side face to exit from an eyeball-side face, and to enter an eye and converge at a position A on a retina; and
 a plurality of defocus regions that are in contact with the base region,
 wherein the defocus regions each include a first portion and a second portion, a refractive power of the first portion is within ±0.12 D of a refractive power of the base region, and
 a light flux that passes through the second portion of the defocus region is incident on the position A as diverging light.

2. The eyeglass lens according to claim 1, wherein the second portion is in the shape of a spherical face.

3. The eyeglass lens according to claim 1, wherein the second portion is in the shape of an aspherical curved face.

4. The eyeglass lens according to claim 1, wherein the defocus regions are convex regions, and the eyeglass lens is a myopia progression suppressing lens.

5. The eyeglass lens according to claim 1, wherein the first portions of the defocus regions do not exert an additional prismatic effect on the base region.

6. The eyeglass lens according to claim 1, wherein, in a graph in which a visual angle [arcmin] is plotted on an X axis, and a light intensity density is plotted on a Y axis, the light intensity density is zero outside a light intensity density peak at a visual angle of zero, and the light intensity density is higher than zero outside the visual angle at which the light intensity density is zero.

* * * * *